US012737477B2

(12) United States Patent
Hen et al.

(10) Patent No.: US 12,737,477 B2
(45) Date of Patent: Sep. 15, 2026

(54) TRIGGERING A SECURITY ACTION BASED ON AN AI-GENERATED CODE PACKAGE RECOMMENDATION

(71) Applicant: Microsoft Technology Licensing, LLC, Redmond, WA (US)

(72) Inventors: Idan Hen, Tel-Aviv (IL); Ron Keller, Ramat Hasharon (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 112 days.

(21) Appl. No.: 18/622,986

(22) Filed: Mar. 31, 2024

(65) Prior Publication Data

US 2025/0307420 A1 Oct. 2, 2025

(51) Int. Cl.

*G06F 21/00* (2013.01)
*G06F 8/36* (2018.01)
*G06F 21/56* (2013.01)
*G06F 21/57* (2013.01)

(52) U.S. Cl.

CPC .............. *G06F 21/577* (2013.01); *G06F 8/36* (2013.01); *G06F 21/563* (2013.01)

(58) Field of Classification Search

CPC ......... G06F 21/563; G06F 8/36; G06F 21/577
USPC ............................................................ 726/25
See application file for complete search history.

(56) References Cited

U.S. PATENT DOCUMENTS 10,769,054 B1 * 9/2020 Henkle ............... G06F 11/3688
11,140,061 B1 * 10/2021 Sanders .................. H04L 43/18
11,757,914 B1 * 9/2023 Jakobsson ............... H04L 51/42 726/25
2012/0254830 A1 * 10/2012 Conrad ............... G06F 11/3604 717/106
2021/0319090 A1 * 10/2021 Demir .................. G06N 3/0475
2022/0188425 A1 6/2022 Wyatt
2023/0308460 A1 * 9/2023 Thomas ................ H04L 63/102
2024/0430685 A1 * 12/2024 Gehani ............... H04W 12/088

(Continued)

OTHER PUBLICATIONS

Bar Lanyado, "Can you trust ChatGPT's package recommendations?", Retrieved from the Internet URL: https://vulcan.io/blog/ai-hallucinations-package-risk, Jun. 6, 2023, 18 pages.

(Continued)

*Primary Examiner* — Josnel Jeudy
(74) *Attorney, Agent, or Firm* — Wade IP Law PLLC

(57) ABSTRACT

Techniques are described herein that are capable of triggering a security action based on an AI-generated recommendation of a code package. An AI model is caused to recommend an identified code package to resolve a coding problem by providing an AI prompt to the AI model. The AI prompt requests identification of a code package that is written in a programming language and that comprises a designated functionality that resolves the coding problem. A response to the AI prompt is received from the AI model. The response identifies the identified code package. Based at least on confirmation of non-existence of the identified code package or absence of publication of the identified code package in a verified code repository or a value of an attribute of the identified code package satisfying a criterion associated with non-trustworthiness, automatic execution of a security action with regard to the identified code package is triggered.

22 Claims, 6 Drawing Sheets

(56) References Cited

U.S. PATENT DOCUMENTS

2025/0190763 A1* 6/2025 Banuelos ............. G06N 3/0455
2025/0231758 A1* 7/2025 Mamidi .................... G06F 8/65
2025/0307417 A1* 10/2025 Cuka .................... G06F 21/577

OTHER PUBLICATIONS

International Search Report and Written Opinion received for PCT Application No. PCT/US2025/012262, Mar. 18, 2025, 15 pages.
Spracklen, et al., "We Have a Package for You! A Comprehensive Analysis of Package Hallucinations by Code Generating LLMs", arXiv:2406.10279v2, Sep. 24, 2024, pp. 1-22.
Zhang, et al., "Self-Contrast: Better Reflection Through Inconsistent Solving Perspectives", arXiv:2401.02009v2, Mar. 27, 2024, 20 pages.

* cited by examiner

FIG. 1

TRIGGERING A SECURITY ACTION BASED ON AN AI-GENERATED CODE PACKAGE RECOMMENDATION

BACKGROUND

Code developers are increasingly using artificial intelligence (AI) platforms to find solutions to coding problems. However, such AI platforms typically rely on large language models (LLMs) that may generate creative responses that do not align with reality. A response that does not align with reality is referred to as a hallucination. A hallucination can be exploited by a malicious entity to spread a malicious code package. For instance, the malicious entity can query an LLM for a package to solve a coding problem, identify a name of a hallucinated code package, and publish the malicious code package under the name of the hallucinated code package. When a legitimate user subsequently queries the LLM to solve a similar problem, the legitimate user may receive a recommendation of the malicious code package from the LLM and then download the malicious code package, which may cause harm to a system or data of the legitimate user.

SUMMARY

It may be desirable to determine whether a code package that is recommended by an artificial intelligence (AI) model exists, is published in a verified (e.g., trusted) code repository, or is otherwise trustworthy by analyzing a plurality of code packages. If the code package is deemed not to exist in the plurality of code packages, not to be published in a verified code repository, or to otherwise be untrustworthy, a security action may be performed, for example, to avoid (e.g., prevent or stop) a malicious attack. For example, a code developer who is writing a computer program may ask the AI model to provide a code package that resolves an issue that the code developer has encountered during the code writing process. If the AI model responds with the identity of a code package that is supposed to resolve the issue, the existence or legitimacy of the code package may be used as a determining factor as to whether the identity of the code package (or the code package itself) is forwarded to the user.

An AI model is a model that utilizes artificial intelligence to generate an answer that is responsive to an AI prompt (a.k.a. prompt) that is received by the AI model. The AI model may be an artificial general intelligence model. An artificial general intelligence model is an AI model (e.g., an autonomous AI model) that is configured to be capable of performing any task that an animal (e.g., a human) is capable of performing. In an example implementation, the artificial general intelligence model is capable of performing a task that surpasses the capabilities of an animal.

Artificial intelligence is intelligence of a machine (e.g., a computing system) and/or code (e.g., software and/or firmware), as opposed to intelligence of an animal (e.g., a human). An AI prompt indicates (e.g., specifies) a task that is to be performed by an AI model. Examples of an AI prompt include but are not limited to a zero-shot prompt, a one-shot prompt, and a few-shot prompt. A zero-shot prompt is a prompt for which the prompt and/or its corresponding contextual information, which are to be processed by the AI model, is not included in pre-trained knowledge of the AI model. A one-shot prompt is a prompt that includes a target prompt along with a single example prompt and a single example answer that is responsive to the single example prompt. The example prompt and the example answer provide guidance as to how the AI model is expected to respond to the target prompt. A few-shot prompt is a prompt that includes a target prompt along with multiple example prompts and multiple example answers that are responsive to the respective example prompts. The example prompts and the example answers provide guidance as to how the AI model is expected to respond to the target prompt.

An AI prompt may be a natural language prompt. A natural language prompt is a prompt that is written in a natural language. A natural language is a human language that has developed through use and repetition. For instance, the natural language may have developed naturally without conscious planning or premeditation. Examples of a natural language include English, French, Spanish, and Mandarin. In an aspect, the natural language prompt is generated by a user (e.g., a human). In another aspect, the natural language prompt is generated by a computing system (e.g., an AI assistant that runs on the computing system).

Various approaches are described herein for, among other things, triggering a security action based on (e.g., based at least on) an AI-generated recommendation of a code package. In an example approach, an AI model is caused to recommend an identified code package to resolve a coding problem by providing an AI prompt to the AI model. The AI prompt specifies the coding problem, a programming language, and a designated functionality that resolves the coding problem. The AI prompt requests that the AI model identify a code package that is written in the programming language and that comprises the designated functionality that resolves the coding problem. A response to the AI prompt is received from the AI model. The response includes a package identifier that identifies the identified code package.

In a first implementation of this approach, a plurality of code packages is analyzed for non-existence of the identified code package or absence of publication of the identified code package in a verified code repository. Based at least on (e.g., in response to or as a result of) confirmation of the non-existence of the identified code package or the absence of the publication of the identified code package in the verified code repository, automatic execution of a security action with regard to the identified code package is triggered.

In a second implementation of this approach, a plurality of code packages is analyzed for existence of the identified code package. Based at least on confirmation of the existence of the identified code package, a determination is made whether a value of an attribute of the identified code package satisfies a criterion associated with non-trustworthiness. Based at least on the value of the attribute of the identified code package satisfying the criterion associated with non-trustworthiness, automatic execution of a security action with regard to the identified code package is triggered.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

FIG. 1 is a block diagram of an example AI-generated code recommendation security system in accordance with an embodiment.

Figure 2:
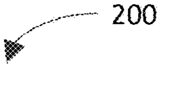
FIGS. 2-3 depict flowcharts of example methods for triggering a security action based on an AI-generated code package recommendation in accordance with embodiments.
Figure 2:
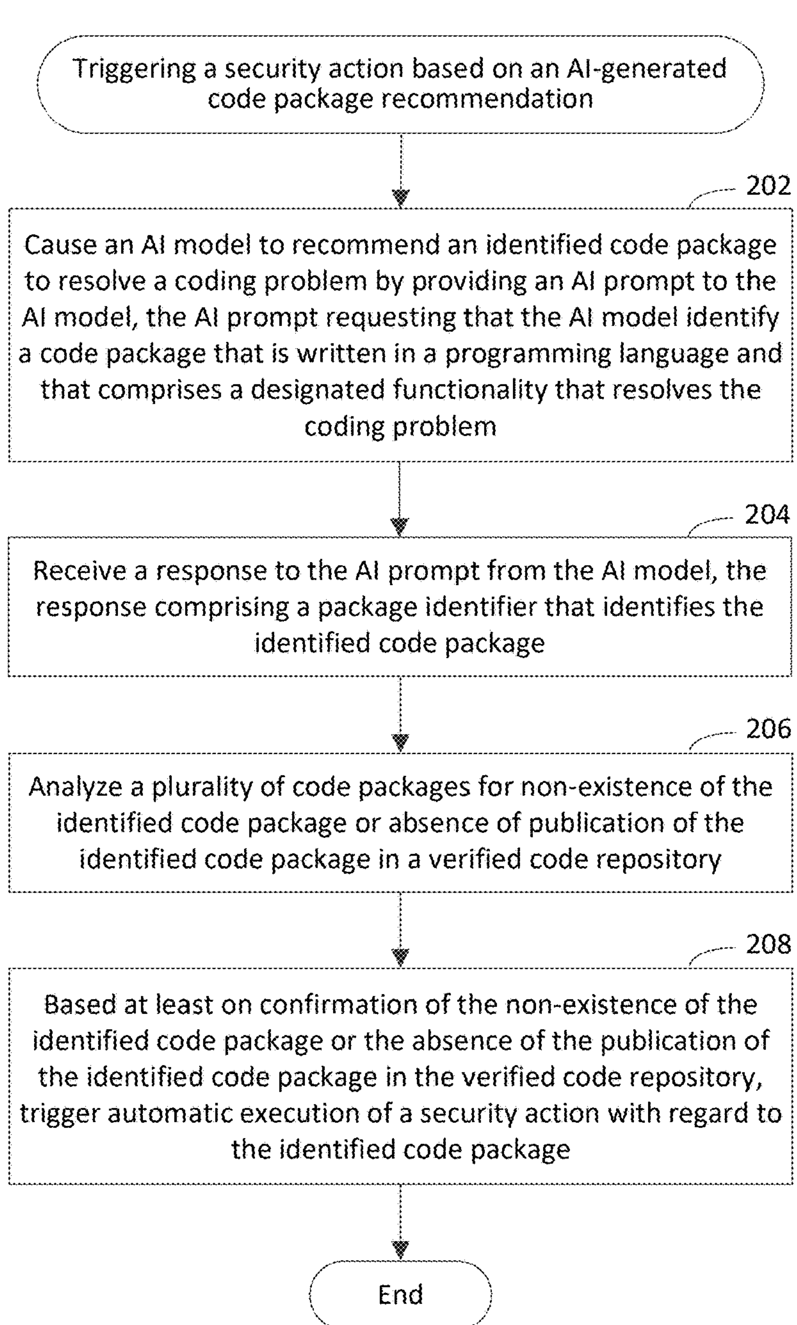

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Example Embodiments

It may be desirable to determine whether a code package that is recommended by an artificial intelligence (AI) model exists, is published in a verified (e.g., trusted) code repository, or is otherwise trustworthy by analyzing a plurality of code packages. If the code package is deemed not to exist in the plurality of code packages, not to be published in a verified code repository, or to otherwise be untrustworthy, a security action may be performed, for example, to avoid (e.g., prevent or stop) a malicious attack. For example, a code developer who is writing a computer program may ask the AI model to provide a code package that resolves an issue that the code developer has encountered during the code writing process. If the AI model responds with the identity of a code package that is supposed to resolve the issue, the existence or legitimacy of the code package may be used as a determining factor as to whether the identity of the code package (or the code package itself) is forwarded to the user.

An AI model is a model that utilizes artificial intelligence to generate an answer that is responsive to an AI prompt (a.k.a. prompt) that is received by the AI model. The AI model may be an artificial general intelligence model. An artificial general intelligence model is an AI model (e.g., an autonomous AI model) that is configured to be capable of performing any task that an animal (e.g., a human) is capable of performing. In an example implementation, the artificial general intelligence model is capable of performing a task that surpasses the capabilities of an animal.

Artificial intelligence is intelligence of a machine (e.g., a computing system) and/or code (e.g., software and/or firmware), as opposed to intelligence of an animal (e.g., a human). An AI prompt indicates (e.g., specifies) a task that is to be performed by an AI model. Examples of an AI prompt include but are not limited to a zero-shot prompt, a one-shot prompt, and a few-shot prompt. A zero-shot prompt is a prompt for which the prompt and/or its corresponding contextual information, which are to be processed by the AI model, is not included in pre-trained knowledge of the AI model. A one-shot prompt is a prompt that includes a target prompt along with a single example prompt and a single example answer that is responsive to the single example prompt. The example prompt and the example answer provide guidance as to how the AI model is expected to respond to the target prompt. A few-shot prompt is a prompt that includes a target prompt along with multiple example prompts and multiple example answers that are responsive to the respective example prompts. The example prompts and the example answers provide guidance as to how the AI model is expected to respond to the target prompt.

An AI prompt may be a natural language prompt. A natural language prompt is a prompt that is written in a natural language. A natural language is a human language that has developed through use and repetition. For instance, the natural language may have developed naturally without conscious planning or premeditation. Examples of a natural language include English, French, Spanish, and Mandarin. In an aspect, the natural language prompt is generated by a user (e.g., a human). In another aspect, the natural language prompt is generated by a computing system (e.g., an AI assistant that runs on the computing system).

Example embodiments described herein are capable of triggering a security action based on (e.g., based at least on) an AI-generated recommendation of a code package. In an example approach, an AI model is caused to recommend an identified code package to resolve a coding problem by providing an AI prompt to the AI model. The AI prompt specifies the coding problem, a programming language, and a designated functionality that resolves the coding problem. The AI prompt requests that the AI model identify a code package that is written in the programming language and that comprises the designated functionality that resolves the coding problem. A response to the AI prompt is received from the AI model. The response includes a package identifier that identifies the identified code package.

In a first implementation of this approach, a plurality of code packages is analyzed for non-existence of the identified code package or absence of publication of the identified code package in a verified code repository. Based at least on (e.g., in response to or as a result of) confirmation of the non-existence of the identified code package or the absence of the publication of the identified code package in the verified code repository, automatic execution of a security action with regard to the identified code package is triggered.

In a second implementation of this approach, a plurality of code packages is analyzed for existence of the identified code package. Based at least on confirmation of the existence of the identified code package, a determination is made whether a value of an attribute of the identified code package satisfies a criterion associated with non-trustworthiness. Based at least on the value of the attribute of the identified code package satisfying the criterion associated with non-trustworthiness, automatic execution of a security action with regard to the identified code package is triggered.

Example techniques described herein have a variety of benefits as compared to conventional techniques for obtaining an AI-generated recommendation of a code package. For instance, the example techniques are capable of increasing security of a computing system associated with a user and/or increasing security of data that is stored in the computing system by determining whether a code package that is recommended by an AI model is non-existent or untrustworthy. By determining whether the code package is non-existent or untrustworthy, the example techniques may perform a security action, such as quarantining (e.g., isolating) the code package in a sandbox, notifying a user (e.g., an end user or an administrator) that the code package is non-existent or untrustworthy, or blocking access to the code package. A sandbox is a region in a store that is isolated from other regions in the store. In an aspect, the sandbox is a virtual container in which untrusted (e.g., malicious or potentially malicious) software programs can be safely executed. In accordance with this aspect, the sandbox is configured to detect when an untrusted software program performs a malicious operation in the virtual container. For instance, a software program can run in the sandbox without negatively impacting software programs that run outside the sandbox and/or without negatively impacting data that is stored outside the sandbox. The example techniques are capable of reducing a likelihood that a package identifier that identifies a hallucinated (i.e., non-existent) or untrustworthy code package recommended by an AI model is provided to a user. For instance, a code package may be deemed to be untrustworthy based on the code package not being published in a verified (e.g., legitimate, trusted, or pre-selected) code repository. The example techniques are capable of reducing a likelihood that the untrustworthy code package is used (e.g., executed) in a system (e.g., a computing system) of the user.

The example techniques may be capable of determining whether a code package recommended by an AI model is a hallucinated code package or an untrustworthy code package more accurately, precisely, and/or reliably than conventional techniques. By triggering automatic execution of a security operation in response to determining that a code package recommended by an AI model is non-existent or untrustworthy, the example techniques may increase a user experience of a user (e.g., an end user or an information technology (IT) professional who is tasked with managing security of a system (e.g., a computer network) in which the recommendation from the AI model is received). The user experience of the user may be increased in other ways, for example, through the increased accuracy, precision, and/or reliability of determining whether a code package recommended by an AI model is a hallucinated code package or an untrustworthy code package. The example techniques may increase an efficiency of the user by reducing the amount of time that the user otherwise would have consumed to determine whether the code package is a hallucinated code package or an untrustworthy code package, assuming that the user would have attempted to make such a determination at all.

The example techniques may reduce an amount of time and/or resources (e.g., processor cycles, memory, network bandwidth) that is consumed by a computing system to determine whether a code package recommended by an AI model is a non-existent or untrustworthy code package and/or to perform a security action if the code package is determined to be a non-existent or untrustworthy code package. For instance, by analyzing code packages for non-existence of the code package recommended by the AI model or absence of publication of the code package in a verified code repository or by determining whether a value of an attribute of the code package satisfies a criterion associated with non-trustworthiness, the amount of time and resources that otherwise would have been consumed to perform such tasks manually (e.g., based on instructions received from a user) may be avoided. Moreover, performing such tasks enables execution of a security action with regard to the code package to be triggered automatically. By automatically triggering execution of the security action with regard to the code package, the amount of time and resources that otherwise would have been consumed to perform the security action manually may be avoided. Automating any of the aforementioned operations may reduce a cost associated with performing the operations. For instance, the cost of protecting a computing system or data stored on the computing system from a malicious attack may be reduced. By reducing the amount of time and/or resources that is consumed by the computing system, the efficiency of the computing system may be increased.

Figure 1:
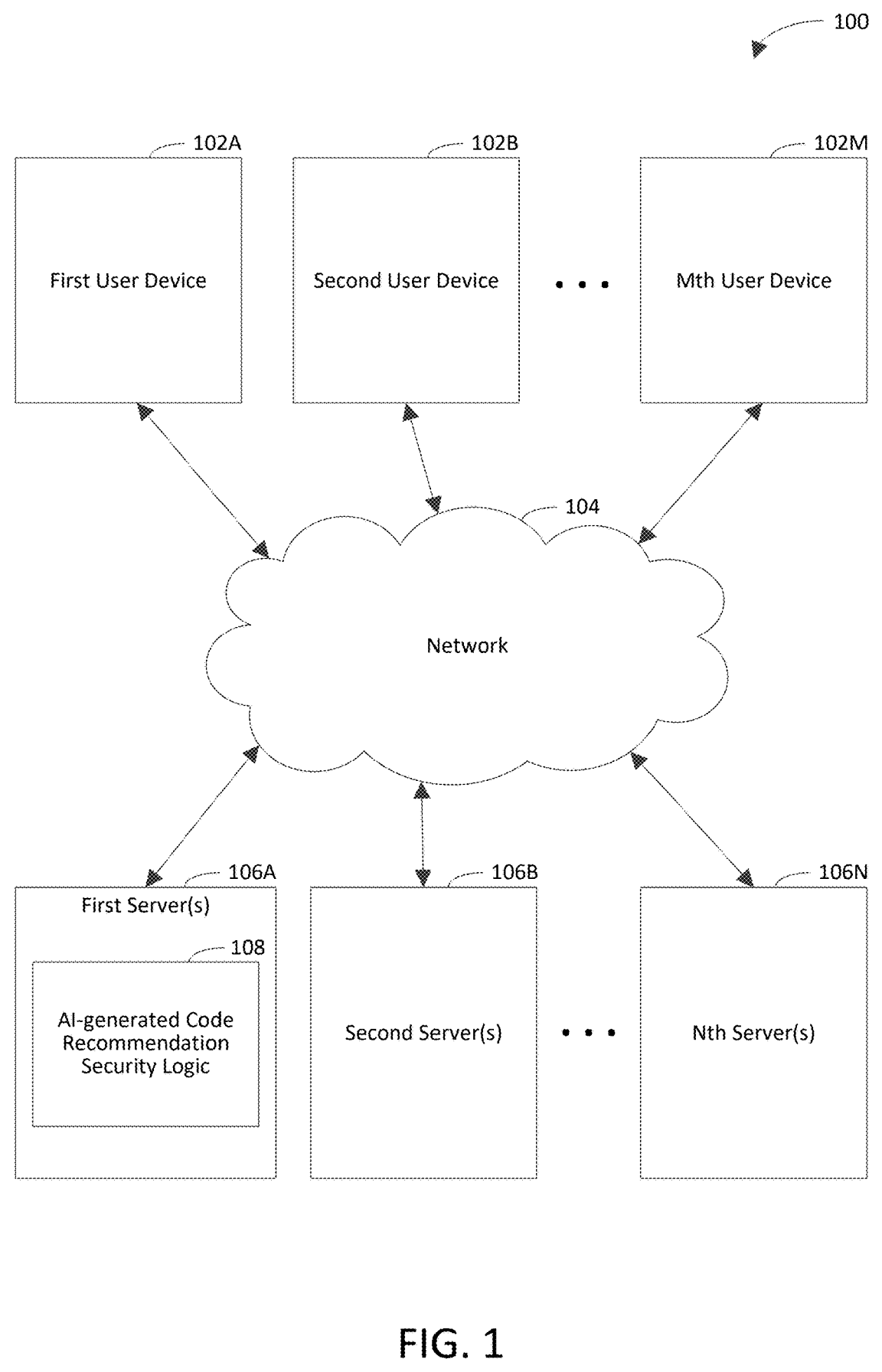

FIG. 1 is a block diagram of an example AI-generated code recommendation security system 100 in accordance with an embodiment. Generally speaking, the AI-generated code recommendation security system 100 operates to provide information to users in response to requests (e.g., hypertext transfer protocol (HTTP) requests) that are received from the users. The information may include documents (Web pages, images, audio files, video files, etc.), output of executables, and/or any other suitable type of information. In accordance with example embodiments described herein, the AI-generated code recommendation security system 100 triggers a security action based on (e.g., based at least on) an AI-generated recommendation of a code package. Detail regarding techniques for triggering a security action based on an AI-generated recommendation of a code package is provided in the following discussion.

As shown in FIG. 1, the AI-generated code recommendation security system 100 includes a plurality of user devices 102A-102M, a network 104, and a plurality of servers 106A-106N. Communication among the user devices 102A-102M and the servers 106A-106N is carried out over the network 104 using well-known network communication protocols. The network 104 may be a wide-area network (e.g., the Internet), a local area network (LAN), another type of network, or a combination thereof.

The user devices 102A-102M are computing systems that are capable of communicating with servers 106A-106N. A computing system is a system that includes at least a portion of a processor system such that the portion of the processor system includes at least one processor that is capable of manipulating data in accordance with a set of instructions. A processor system includes one or more processors, which may be on a same (e.g., single) device or distributed among multiple (e.g., separate) devices. For instance, a computing system may be a computer, a personal digital assistant, etc. The user devices 102A-102M are configured to provide requests to the servers 106A-106N for requesting information stored on (or otherwise accessible via) the servers 106A-106N. For instance, a user may initiate a request for executing a computer program (e.g., an application) using a client (e.g., a Web browser, Web crawler, or other type of client) deployed on a user device 102 that is owned by or otherwise accessible to the user. In accordance with some example embodiments, the user devices 102A-102M are capable of accessing domains (e.g., Web sites) hosted by the servers 104A-104N, so that the user devices 102A-102M may access information that is available via the domains.

Such domain may include Web pages, which may be provided as hypertext markup language (HTML) documents and objects (e.g., files) that are linked therein, for example.

Each of the user devices 102A-102M may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, or the like. It will be recognized that any one or more of the user devices 102A-102M may communicate with any one or more of the servers 106A-106N.

The servers 106A-106N are computing systems that are capable of communicating with the user devices 102A-102M. The servers 106A-106N are configured to execute computer programs that provide information to users in response to receiving requests from the users. For example, the information may include documents (Web pages, images, audio files, video files, etc.), output of executables, or any other suitable type of information. In accordance with some example embodiments, the servers 106A-106N are configured to host respective Web sites, so that the Web sites are accessible to users of the complex expression-based metadata generation system 100.

One example type of computer program that may be executed by one or more of the servers 106A-106N is a developer tool. A developer tool is a computer program that performs diagnostic operations (e.g., identifying source of problem, debugging, profiling, controlling, etc.) with respect to program code. Examples of a developer tool include an integrated development environment (IDE) and a web development platform. Examples of an IDE include Microsoft Visual Studio® IDE, developed and distributed by Microsoft Corporation; AppCode® IDE, PhpStorm® IDE, Rider® IDE, WebStorm® IDE, etc., developed and distributed by JetBrains s.r.o.; JDeveloper® IDE, developed and distributed by Oracle International Corporation; NetBeans® IDE, developed and distributed by Sun Microsystems, Inc.; Eclipse™ IDE, developed and distributed by Eclipse Foundation; and Android Studio™ IDE, developed and distributed by Google LLC and JetBrains s.r.o. Examples of a web development platform include Windows Azure® platform, developed and distributed by Microsoft Corporation; Amazon Web Services® platform, developed and distributed by Amazon.com, Inc.; Google App Engine® platform, developed and distributed by Google LLC; VMWare® platform, developed and distributed by VMWare, Inc.; and Force.com® platform, developed and distributed by Salesforce, Inc. It will be recognized that the example techniques described herein may be implemented using a developer tool.

Another example type of a computer program that may be executed by one or more of the servers 106A-106N is a cloud computing program (a.k.a. cloud service). A cloud computing program is a computer program that provides hosted service(s) via a network (e.g., network 104). For instance, the hosted service(s) may be hosted by any one or more of the servers 106A-106N. The cloud computing program may enable users (e.g., at any of the user systems 102A-102M) to access shared resources that are stored on or are otherwise accessible to the server(s) via the network.

The cloud computing program may provide hosted service(s) according to any of a variety of service models, including but not limited to Backend as a Service (BaaS), Software as a Service (SaaS), Platform as a Service (PaaS), and Infrastructure as a Service (IaaS). BaaS enables applications (e.g., software programs) to use a BaaS provider's backend services (e.g., push notifications, integration with social networks, and cloud storage) running on a cloud infrastructure. SaaS enables a user to use a SaaS provider's applications running on a cloud infrastructure. PaaS enables a user to develop and run applications using a PaaS provider's application development environment (e.g., operating system, programming-language execution environment, database) on a cloud infrastructure. IaaS enables a user to use an IaaS provider's computer infrastructure (e.g., to support an enterprise). For example, IaaS may provide to the user virtualized computing resources that utilize the IaaS provider's physical computer resources.

Examples of a cloud computing program include Google Cloud® program, developed and distributed by Google LLC; Oracle Cloud® program, developed and distributed by Oracle Corporation; Amazon Web Services® program, developed and distributed by Amazon.com, Inc.; Salesforce® program, developed and distributed by Salesforce.com, Inc.; AppSource® and Azure® programs, developed and distributed by Microsoft Corporation; GoDaddy® program, developed and distributed by GoDaddy.com LLC; and Rackspace® program, developed and distributed by Rackspace US, Inc. It will be recognized that the example techniques described herein may be implemented using a cloud computing program. For instance, a software product (e.g., a subscription service, a non-subscription service, or a combination thereof) may include the cloud computing program, and the software product may be configured to perform the example techniques, though the scope of the example embodiments is not limited in this respect.

The first server(s) 106A are shown to include AI-generated code recommendation security logic 108 for illustrative purposes. The AI-generated code recommendation security logic 108 is configured to trigger a security action based on (e.g., based at least on) an AI-generated recommendation of a code package. In an example implementation, the AI-generated code recommendation security logic 108 causes an AI model to recommend an identified code package to resolve a coding problem by providing an AI prompt to the AI model. The AI prompt requests that the AI model identify a code package that is written in a programming language and that comprises a designated functionality that resolves the coding problem. For instance, the AI prompt may specify the coding problem, the programming language, and the designated functionality that resolves the coding problem.

A coding problem is a problem that is encountered by code (e.g., software or firmware). Examples of a coding problem include but are not limited to a missing functionality problem, a syntax problem (a.k.a. a compile-time problem), and a logic problem (a.k.a. a run-time problem). A missing functionality problem is a problem that results from code not including desired functionality (e.g., not being incomplete). If the coding problem is a missing functionality problem, the designated functionality that resolves the coding problem may include (e.g., be) the desired functionality.

A syntax problem is a problem that results from code violating a rule of a programming language. Accordingly, the syntax problem may be discovered at compile-time of the code by a compiler. Examples of a syntax problem that may be encountered by code include but are not limited to a missing semicolon, parenthesis, or bracket; an improper indentation within the code; printing a value of a variable that is undeclared; and a misspelled keyword or identifier. If the coding problem is a syntax problem, the designated functionality that resolves the coding problem may be configured to modify the code so that the code no longer violates the rule of the programming language. For instance, the designated functionality may be configured to insert a missing semicolon, parenthesis, or bracket into the code; change an indentation within the code, declare a previously undeclared variable; correct spelling of a keyword or identifier, and so on.

A logic problem is a problem that results from code including faulty logic, which causes the code, when executed, to provide an unexpected output. Accordingly, the logic problem may be discovered after compilation of the code and during run-time of the code. Examples of a logic problem that may be encountered by code include but are not limited to exceeding a time limit, dividing a number by zero, and calculating a square root of a negative number. If the coding problem is a logic problem, the designated functionality that resolves the coding problem may be configured to modify the logic so that the code, when executed, provides an expected output (e.g., no longer provides the unexpected output). For instance, the designated functionality may be configured to modify the logic so that a time limit is no longer exceeded, a number is no longer divided by zero, or a radicand whose square root is being calculated is non-negative (i.e., is positive or zero).

The AI-generated code recommendation security logic 108 receives a response to the AI prompt from the AI model. The response includes a package identifier that identifies the identified code package.

In a first example of this implementation, the AI-generated code recommendation security logic 108 analyzes a plurality of code packages for non-existence of the identified code package or absence of publication of the identified code package in a verified code repository. In accordance with the first example, based at least on confirmation of the non-existence of the identified code package or the absence of the publication of the identified code package in the verified code repository, the AI-generated code recommendation security logic 108 triggers automatic execution of a security action with regard to the identified code package.

In a second example of this implementation, the AI-generated code recommendation security logic 108 analyzes a plurality of code packages for existence of the identified code package. In accordance with the second example, based at least on confirmation of the existence of the identified code package, the AI-generated code recommendation security logic 108 determines whether a value of an attribute of the identified code package satisfies a criterion associated with non-trustworthiness. In further accordance with the second example, based at least on the value of the attribute of the identified code package satisfying the criterion associated with non-trustworthiness, the AI-generated code recommendation security logic 108 triggers automatic execution of a security action with regard to the identified code package.

The AI-generated code recommendation security logic 108 may be implemented in various ways to trigger a security action based on an AI-generated recommendation of a code package, including being implemented in hardware, software, firmware, or any combination thereof. For example, the AI-generated code recommendation security logic 108 may be implemented as computer program code configured to be executed in one or more processors. In another example, at least a portion of the AI-generated code recommendation security logic 108 may be implemented as hardware logic/electrical circuitry. For instance, at least a portion of the AI-generated code recommendation security logic 108 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (a microcontroller, microprocessor, digital signal processor (DSP), etc.), memory, one or more communication interfaces, and/or further circuits and/or embedded firmware to perform its functions.

It will be recognized that the AI-generated code recommendation security logic 108 may be (or may be included in) a developer tool and/or a cloud computing program, though the scope of the example embodiments is not limited in this respect.

The AI-generated code recommendation security logic 108 is shown to be incorporated in the first server(s) 106A for illustrative purposes and is not intended to be limiting. It will be recognized that the AI-generated code recommendation security logic 108 (or any portion(s) thereof) may be incorporated in any one or more of the servers 106A-106N, any one or more of the user devices 102A-102M, or any combination thereof. For example, client-side aspects of the AI-generated code recommendation security logic 108 may be incorporated in one or more of the user devices 102A-102M, and server-side aspects of AI-generated code recommendation security logic 108 may be incorporated in one or more of the servers 106A-106N.

Figure 3:
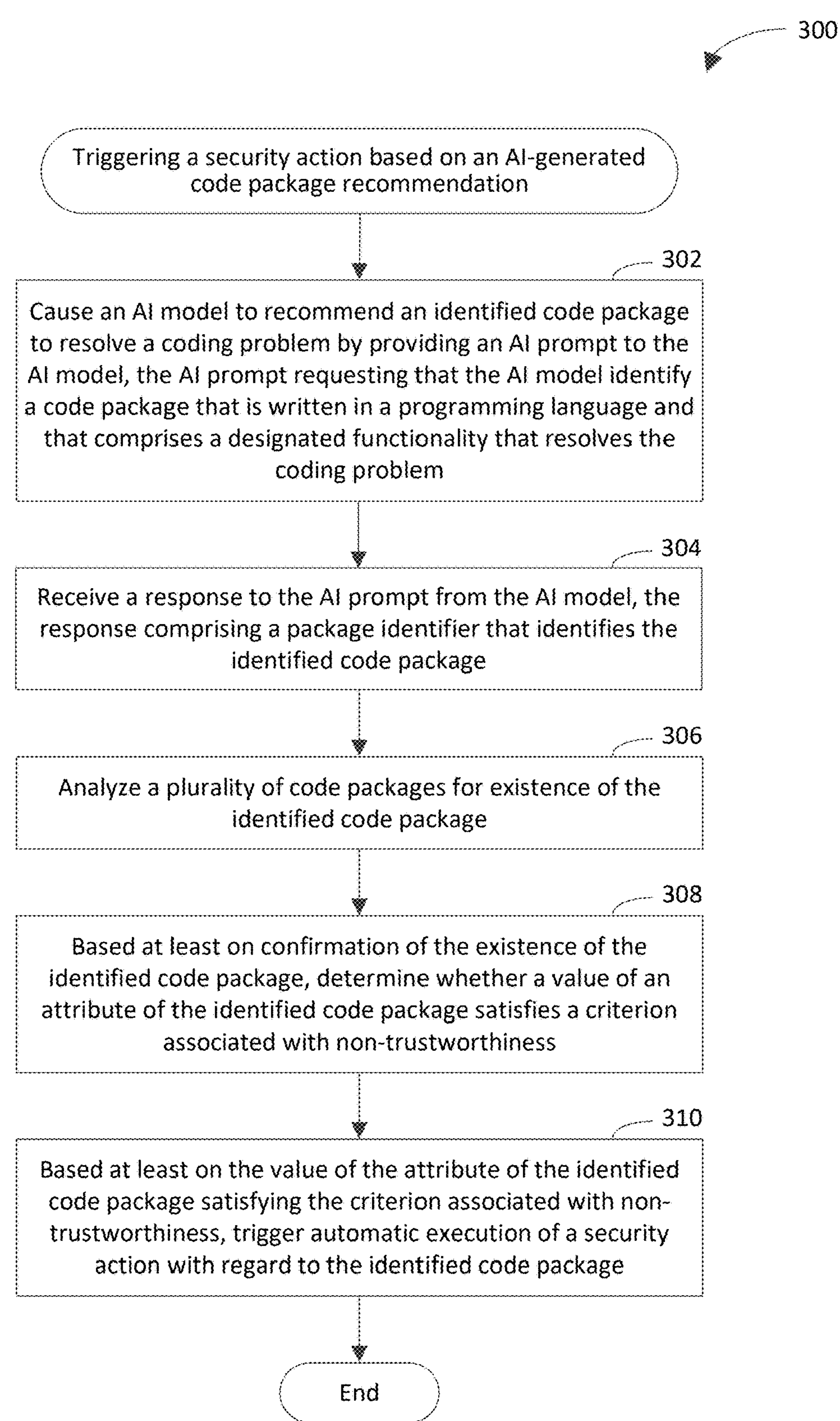
Figure 4:
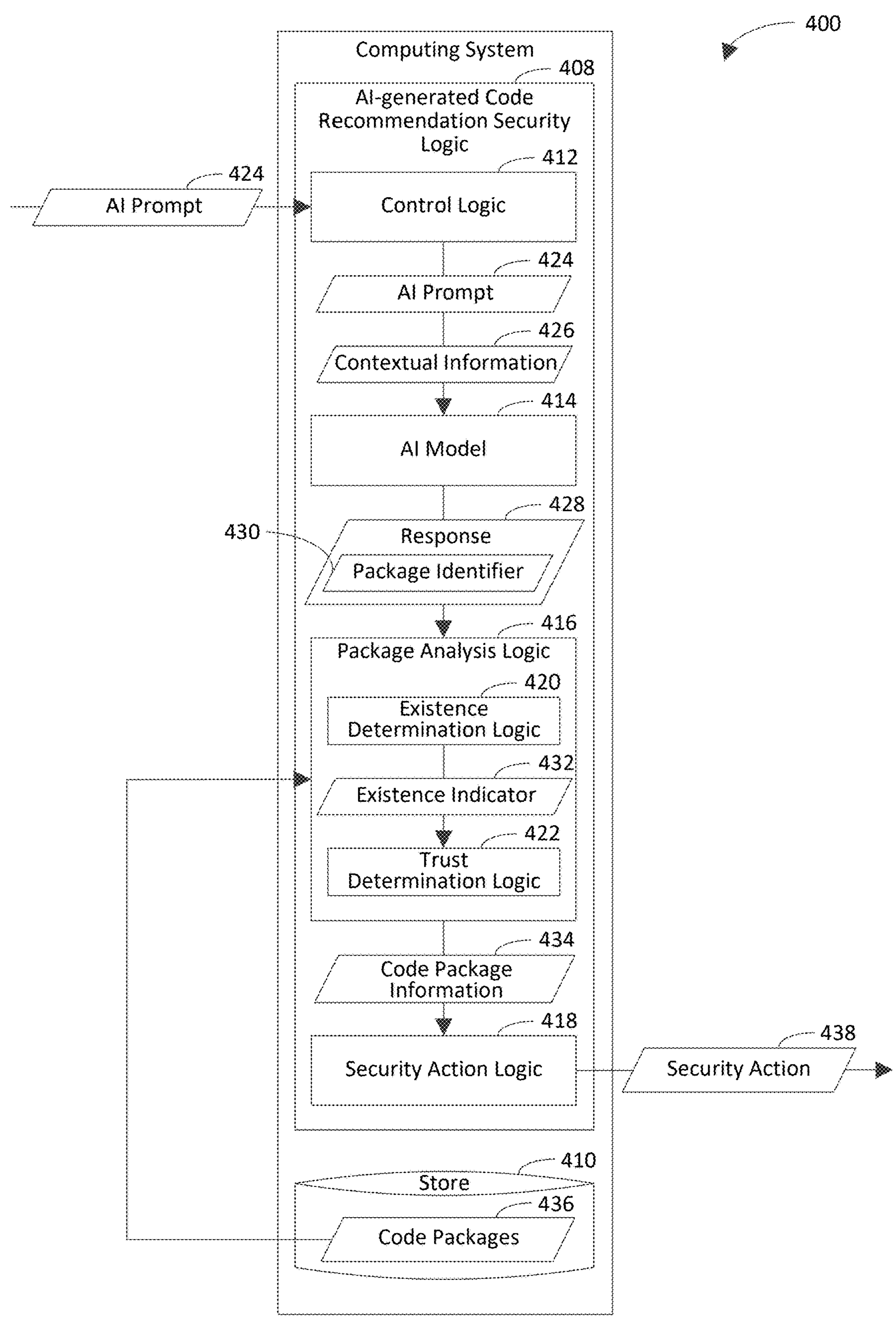
FIG. 4 is a block diagram of an example computing system in accordance with an embodiment.

FIGS. 2-3 depict flowcharts 200 and 300 of example methods for triggering a security action based on an AI-generated code package recommendation in accordance with embodiments. Flowcharts 200 and 300 may be performed by the first server(s) 106A shown in FIG. 1, for example. For illustrative purposes, flowcharts 200 and 300 are described with respect to a computing system 400 shown in FIG. 4, which is an example implementation of the first server(s) 106A. As shown in FIG. 4, the computing system 400 includes AI-generated code recommendation security logic 408 and a store 410. The AI-generated code recommendation security logic 408 includes control logic 412, an AI model 414, package analysis logic 416, and security action logic 418. The package analysis logic 416 includes existence determination logic 420 and trust determination logic 422. The store 410 may be any suitable type of store. One type of store is a database. For instance, the store 410 may be a relational database, an entity-relationship database, an object database, an object relational database, an extensible markup language (XML) database, etc. The store 410 is shown to store code packages 436 for non-limiting, illustrative purposes. Further structural and operational embodiments will be apparent to persons skilled in the relevant art(s) based on the discussion regarding flowcharts 200 and 300.

As shown in FIG. 2, the method of flowchart 200 begins at step 202. In step 202, an AI model is caused to recommend an identified code package to resolve a coding problem by providing an AI prompt to the AI model. The AI prompt requests that the AI model identify a code package that is written in a programming language and that comprises a designated functionality that resolves the coding problem. For instance, the AI prompt may specify the coding problem, the programming language, and the designated functionality that resolves the coding problem. In an example implementation, the control logic 412 causes the AI model 414 to recommend the identified code package to resolve the coding problem by providing an AI prompt 424 to the AI model 414. The AI prompt 424 specifies the coding problem, the programming language, and the designated functionality that resolves the coding problem. The AI prompt 424 requests that the AI model 414 identify a code package that is written in the programming language and that comprises the designated functionality that resolves the coding problem.

In an example embodiment, causing the AI model to recommend the identified code package at step 202 includes providing the AI prompt together with code that is being accessed by a user (e.g., code under development) as inputs to the AI model. The AI prompt requests that the AI model identify a code package that is written in the programming language and that comprises the designated functionality that resolves the coding problem associated with the code that is being accessed by the user. The code that is being accessed by the user comprises context regarding the AI prompt.

In another example embodiment, the control logic 412 causes the AI model 414 to analyze (e.g., develop and/or refine an understanding of) the AI prompt 424 (e.g., the coding problem, the programming language, and the designated functionality specified therein), contextual information 426 (e.g., code that is under development by a user of the computing system 400), relationships between any of the foregoing, and confidences in those relationships. For example, the control logic 412 may cause the AI model 414 to compare attributes of the AI prompt 424 and the contextual information 426 (which may include sample AI prompt(s) and sample code under development) using artificial intelligence to recommend the identified code package for resolving the coding problem.

In an aspect of this embodiment, the control logic 412 performs one or more pre-processing operations on the contextual information 426 (e.g., code that is being written by a user of the computing system 400) prior to providing the contextual information 426 to the AI model 414. Examples of a pre-processing operation include but are not limited to removing comma(s), slash(es), and/or white space (s) (e.g., tab(s) and/or redundant blank space(s)) from the contextual information 426. It will be recognized that the control logic 412 need not necessarily provide the contextual information 426 to the AI model 414. For instance, the control logic 412 may provide the AI prompt 424 without the contextual information 426 to the AI model 414 for processing.

In some example embodiments, the AI model 414 includes a neural network that uses the artificial intelligence to determine (e.g., predict) relationships between the AI prompt 424 and the contextual information 426 and confidences in the relationships. The neural network uses those relationships to determine (e.g., derive or select) the identified code package that is to be recommended for resolving the coding problem. For example, attributes of the AI prompt 424 and potentially the contextual information 426 (which may include example AI prompt(s) and example code under development) may be compared to determine similarities and differences between those attributes. In accordance with this example, the neural network may use those similarities and differences to determine the identified code package that is to be recommended for resolving the coding problem.

Examples of a neural network include but are not limited to a feed forward neural network and a transformer-based neural network. A feed forward neural network is an artificial neural network for which connections between units in the neural network do not form a cycle. The feed forward neural network allows data to flow forward (e.g., from the input nodes toward to the output nodes), but the feed forward neural network does not allow data to flow backward (e.g., from the output nodes toward to the input nodes). In an example embodiment, the control logic 412 employs a feed forward neural network to train the AI model 414, which is used to determine AI-based confidences. Such AI-based confidences may be used to determine likelihoods that events will occur.

A transformer-based neural network is a neural network that incorporates a transformer. A transformer is a deep learning model that utilizes attention to differentially weight the significance of each portion of sequential input data, such as natural language. Attention is a technique that mimics cognitive attention. Cognitive attention is a behavioral and cognitive process of selectively concentrating on a discrete aspect of information while ignoring other perceivable aspects of the information. Accordingly, the transformer uses the attention to enhance some portions of the input data while diminishing other portions. The transformer determines which portions of the input data to enhance and which portions of the input data to diminish based on the context of each portion. For instance, the transformer may be trained to identify the context of each portion using any suitable technique, such as gradient descent.

In an example embodiment, the transformer-based neural network generates a code recommendation model (e.g., to determine code packages that are to be recommended for resolving coding problems) by utilizing information, such as AI prompts (e.g., the AI prompt 424), contextual information (e.g., contextual information 426), relationships between any of the foregoing, and AI-based confidences that are derived therefrom.

In example embodiments, the AI prompt 424 includes training logic, and the AI model 414 includes inference logic. The training logic is configured to train an AI algorithm that the inference logic uses to determine (e.g., infer) the AI-based confidences. For instance, the training logic may provide sample AI prompts and sample contextual information (e.g., sample code under development) as inputs to the AI algorithm to train the AI algorithm. The sample data may be labeled. The AI algorithm may be configured to derive relationships between the features (e.g., the AI prompt 424 and the contextual information 426) and the resulting AI-based confidences. The inference logic is configured to utilize the AI algorithm, which is trained by the training logic, to determine the AI-based confidence when the features are provided as inputs to the algorithm.

In an example embodiment, the AI model 414 includes (e.g., is) a generative language model. A generative language model is an AI model that is capable of generating original text output based on sample data. Examples of a generative language model include but are not limited to a generative pre-trained transformer 3 (a.k.a., GPT-3®) model and a generative pre-trained transformer 4 (a.k.a. GPT-4®) model, developed and distributed by OpenAI, Inc.; a large language model Meta AI (a.k.a. LLaMAR) model, developed and distributed by Meta Platforms Inc.; a language model for dialogue applications (a.k.a., LaMDA®) model, developed and distributed by Google LLC; and a BigScience large open-science open-access multilingual language model (a.k.a. BLOOM) model, developed and distributed by the BigScience collaborative initiative. A generative language model may use any suitable relevancy determination and/or ranking technique. For instance, the generative language model may use a BM25 (a.k.a. Okapi BM25) ranking function to perform its analysis (e.g., based on keywords).

In another example embodiment, the AI model 414 includes a large language model (LLM). A large language model is an artificial neural network that is capable of performing natural language processing (NLP) tasks. For instance, the large language model may use a transformer model to perform the NLP tasks. In an aspect, the large language model is trained (e.g., pre-trained) using self-supervised learning and semi-supervised learning. Examples of a large language model include but are not limited to the GPT-3® and GPT-4® models, developed and distributed by OpenAI, Inc.; the LLaMAR model, developed and distributed by Meta Platforms Inc.; and a pathways language model (a.k.a., PaLM®) model, developed and distributed by Google LLC.

In yet another example embodiment, the AI model 414 includes an embedding model. An embedding model is an AI model that uses deep learning to convert data into vectors, which represent attributes of the data, and that compares at least a subset of the vectors to determine an extent to which the vectors that are included in the subset are similar. For instance, each vector may represent a semantic meaning of an AI prompt or code under development.

In still another example embodiment, the AI model 414 includes multiple types of AI models. Weights may be applied to the responses generated by the respective types of AI models. For example, the AI model 414 may include a generative AI model and an embedding model. In accordance with this example, a first weight may be applied to a first response generated by the generative AI model to provide a first weighted response, and a second weight that is different from the first weight may be applied to a second response of the embedding model to provide a second weighted response. The AI model 414 may combine (e.g., sum) the first weighted response and the second weighted response to generate a response of the AI model 414.

At step 204, a response to the AI prompt is received from the AI model. The response comprises a package identifier that identifies (e.g., uniquely identifies) the identified code package. For instance, the package identifier may include a name of the identified code package and/or a description of the identified code package. In an example implementation, the existence determination logic 420 receives a response 428 to the AI prompt 424 from the AI model 414. The response 428 comprises a package identifier 430 that identifies the identified code package.

At step 206, a plurality of code packages is analyzed for non-existence of the identified code package or absence of publication of the identified code package in a verified code repository. In an aspect, the non-existence of the identified code package is a result of the identified code package being expired, deleted, or never created. In another aspect, the absence of publication of the identified code package in the verified code repository is a result of the identified code package being deleted from the verified code repository or never being published in the verified code repository. In an example implementation, the existence determination logic 420 analyzes a plurality of code packages 436 for non-existence of the identified code package or absence of publication of the identified code package in the verified code repository. In accordance with this implementation, the existence determination logic 420 generates code package information 434 to indicate whether the identified code package exists and/or whether the identified code package is published in the verified code repository.

At step 208, based at least on confirmation of the non-existence of the identified code package or the absence of the publication of the identified code package in the verified code repository, automatic execution of a security action with regard to the identified code package is triggered. In an example implementation, based at least on confirmation of the non-existence of the identified code package or the absence of the publication of the identified code package in the verified code repository, the security action logic 418 triggers automatic execution of a security action 438 with regard to the identified code package. For example, the code package information 434 indicating that the identified code package does not exist may serve as confirmation of the non-existence of the identified code package. In another example, the code package information 434 indicating that the identified code package is not published in the verified code repository may serve as confirmation of the absence of the publication of the identified code package in the verified code repository.

In an example embodiment, triggering the automatic execution of the security action at step 208 includes triggering automatic execution of a computer-executable instruction that provides an alert regarding the identified package to a user via a user interface.

In another example embodiment, analyzing the plurality of code packages at step 206 includes cross-referencing the identified code package with the plurality of code packages, which are known to exist. For example, cross-referencing the identified code package with the plurality of code packages may include cross-referencing a first value of an attribute of the identified code package with second values of the attribute of respective code packages in the plurality of code packages. Examples of an attribute of a code package include a name of the code package, a description of the code package, and a source of the code package. In accordance with this embodiment, triggering the automatic execution of the security action with regard to the identified code package at step 208 is based at least on confirmation of absence of the identified code package in the plurality of code packages.

In yet another example embodiment, analyzing the plurality of code packages at step 206 includes analyzing the plurality of code packages for the absence of the publication of the identified code package in the verified code repository. In accordance with this embodiment, triggering the automatic execution of the security action with regard to the identified code package at step 208 is based at least on the confirmation of the absence of the publication of the identified code package in the verified code repository.

In still another example embodiment, the AI prompt specifies that the AI model is to select the code package from the plurality of code packages in a specified code repository. In an aspect of this embodiment, the specified code repository includes (e.g., is) a python package Index® (a.k.a. PyPI®) repository, developed and distributed by Python Software Foundation. In another aspect of this embodiment, the specified code repository includes an Npm® repository, developed and distributed by npm, Inc. In accordance with this embodiment, analyzing the plurality of code packages at step 206 includes analyzing the plurality of code packages for absence of publication of the identified code package in the specified code repository. In further accordance with this embodiment, triggering the automatic execution of the security action with regard to the identified code package at step 208 is based at least on confirmation of the absence of the publication of the identified code package in the specified code repository.

In some example embodiments, one or more steps 202, 204, 206, and/or 208 of flowchart 200 may not be performed. Moreover, steps in addition to or in lieu of steps 202, 204, 206, and/or 208 may be performed. For instance, in an example embodiment, the method of flowchart 200 further includes receiving the AI prompt from a user. In an example implementation, the control logic 412 receives the AI prompt 424 from the user. In accordance with this embodiment, triggering the automatic execution of the security action at step 208 includes triggering automatic execution of a computer-executable instruction that blocks the package identifier and/or the identified package from being provided to the user.

In another example embodiment, the method of flowchart 200 further includes receiving the AI prompt from a user. In an example implementation, the control logic 412 receives the AI prompt 424 from the user. In accordance with this embodiment, triggering the automatic execution of the security action at step 208 includes triggering automatic execution of a computer-executable instruction that generates a second response from the response to the AI prompt by replacing the package identifier in the response with a second package identifier that identifies a second code package, which is different from the identified code package. In further accordance with this embodiment, triggering the automatic execution of the security action at step 208 further includes providing the second response in lieu of the response to the user.

As shown in FIG. 3, the method of flowchart 300 begins at step 302. In step 302, an AI model is caused to recommend an identified code package to resolve a coding problem by providing an AI prompt to the AI model. The AI prompt requests that the AI model identify a code package that is written in a programming language and that comprises a designated functionality that resolves the coding problem. For instance, the AI prompt may specify the coding problem, the programming language, and the designated functionality that resolves the coding problem. In an example implementation, the control logic 412 causes the AI model 414 to recommend the identified code package to resolve the coding problem by providing an AI prompt 424 to the AI model 414. The AI prompt 424 specifies the coding problem, the programming language, and the designated functionality that resolves the coding problem. The AI prompt 424 requests that the AI model 414 identify a code package that is written in the programming language and that comprises the designated functionality that resolves the coding problem.

At step 304, a response to the AI prompt is received from the AI model. The response comprises a package identifier that identifies (e.g., uniquely identifies) the identified code package. For instance, the package identifier may include a name of the identified code package and/or a description of the identified code package. In an example implementation, the existence determination logic 420 receives a response 428 to the AI prompt 424 from the AI model 414. The response 428 comprises a package identifier 430 that identifies the identified code package.

At step 306, a plurality of code packages is analyzed for non-existence of the identified code package. In an aspect, the non-existence of the identified code package is a result of the identified code package being expired, deleted, or never created. In an example implementation, the existence determination logic 420 analyzes a plurality of code packages 436 for non-existence of the identified code package. In accordance with this implementation, the existence determination logic 420 generates an existence indicator 432, which indicates whether the identified code package exists.

At step 308, based at least on confirmation of the existence of the identified code package, a determination is made whether a value of an attribute of the identified code package satisfies a criterion associated with non-trustworthiness. In an example implementation, based at least on confirmation of the existence of the identified code package, the trust determination logic 422 determines whether the value of the attribute of the identified code package satisfies the criterion associated with non-trustworthiness. For instance, the trust determination logic 422 may determine whether the value of the attribute of the identified code package satisfies the criterion associated with non-trustworthiness based at least on the existence indicator 432 indicating that the identified code package exists. In accordance with this implementation, the trust determination logic 422 generates code package information 434 to indicate whether the value of the attribute of the identified code package satisfies the criterion associated with non-trustworthiness.

At step 310, based at least on the value of the attribute of the identified code package satisfying the criterion associated with non-trustworthiness, automatic execution of a security action with regard to the identified code package is triggered. In an example implementation, based at least on the value of the attribute of the identified code package satisfying the criterion associated with non-trustworthiness, the security action logic 418 triggers automatic execution of a security action 438 with regard to the identified code package. For instance, the security action logic 418 may trigger automatic execution of the security action 438 with regard to the identified code package based at least on the code package information 434 indicating that the value of the attribute of the identified code package satisfies the criterion associated with non-trustworthiness.

In an example embodiment, the AI prompt specifies that the AI model is to derive the code package from code packages in a specified code repository. In an aspect of this embodiment, the specified code repository includes (e.g., is) a PyPI® repository, developed and distributed by Python Software Foundation. In another aspect of this embodiment, the specified code repository includes an Npm® repository, developed and distributed by npm, Inc. In accordance with this embodiment, the package identifier identifies the identified code package, which is derived from the code packages in the specified code repository.

In another example embodiment, the AI prompt specifies that the AI model is to use a designated computer program, which is separate from the AI model, to identify the identified code package. The designated computer program is configured to search in a specified code repository for the identified code package. In accordance with this embodiment, analyzing the plurality of code packages at step 306 includes analyzing the plurality of code packages in the specified code repository for the existence of the identified code package. In further accordance with this embodiment, determining whether the value of the attribute of the identified code package satisfies the criterion associated with non-trustworthiness is performed at step 308 based at least on confirmation of the existence of the identified code package in the specified code repository.

In yet another example embodiment, the AI prompt specifies that the AI model is to use a designated computer program, which is separate from the AI model, to determine whether the value of the attribute of the identified code package violates a security policy. In a first aspect of this embodiment, the designated computer program utilizes static rules to make the determination. In a second aspect of this embodiment, the designated computer program utilizes AI to make the determination. In a third aspect of this embodiment, the designated computer program utilizes a combination of static rules and AI to make the determination. In accordance with this embodiment, step 308 includes, based at least on confirmation of the existence of the identified code package in the specified code repository, causing the AI model to determine, by using the designated computer program, whether the value of the attribute of the identified code package violates the security policy. In further accordance with this embodiment, the automatic execution of the security action with regard to the identified code package is triggered at step 310 based at least on the value of the attribute of the identified code package violating the security policy.

In an aspect of this embodiment, step 308 includes, based at least on confirmation of the existence of the identified code package in the specified code repository, causing the AI model to determine, by using the designated computer program, whether identified code package comprises malware. In accordance with this aspect, the automatic execution of the security action with regard to the identified code package is triggered at step 310 based at least on the identified code package comprising the malware.

In still another example embodiment, the AI prompt specifies that the AI model is to use a designated computer program, which is separate from the AI model, to determine whether the identified code package violates an authentication policy that requires the identified code package to be authenticated. In accordance with this embodiment, step 308 includes, based at least on confirmation of the existence of the identified code package in the specified code repository, causing the AI model to determine, by using the designated computer program, whether the identified code package violates the authentication policy. In further accordance with this embodiment, the automatic execution of the security action with regard to the identified code package is triggered at step 310 based at least on the identified code package violating the authentication policy.

In an aspect of this embodiment, step 308 includes, based at least on confirmation of the existence of the identified code package in the specified code repository, causing the AI model to determine, by using the designated computer program, whether a certificate associated with the identified code package is invalid. For instance, the certificate may be invalid based at least on the certificate being expired and/or being different from a reference certificate. In accordance with this aspect, the automatic execution of the security action with regard to the identified code package is triggered at step 310 based at least on the certificate associated with the identified code package being invalid.

In another example embodiment, the AI prompt further specifies that the AI model is to provide a reference that indicates a location of the identified code package (e.g., in memory). For instance, the reference may be a link to the location. In accordance with this embodiment, step 308 includes, based at least on confirmation of the existence of the identified code package in the specified code repository, determining whether the AI model provides the reference that indicates a valid location of the identified code package. In a first aspect of this embodiment, the automatic execution of the security action with regard to the identified code package is triggered at step 310 based at least on confirmation that the AI model fails to provide the reference that indicates the valid location of the identified code package. In a second aspect of this embodiment, the automatic execution of the security action with regard to the identified code package is triggered at step 310 based at least on confirmation that the reference provided by the AI model indicates an invalid (e.g., incorrect or non-existent) location of the identified code package.

In yet another example embodiment, step 306 includes analyzing the plurality of code packages for publication of the identified code package in a verified code repository. In accordance with this embodiment, determining whether the value of the attribute of the identified code package satisfies the criterion associated with non-trustworthiness at step 308 is based at least on confirmation of the publication of the identified code package in the verified code repository.

In still another example embodiment, step 308 includes, based at least on the confirmation of the existence of the identified code package, analyzing the identified code package relative to a historical value of the attribute of a different code package, which has been recommended by the AI model, using natural language processing. In accordance with this embodiment, the criterion requires a difference between the value of the attribute of the identified code package and the historical value of the attribute of the different code package to be greater than or equal to a threshold difference (e.g., a designated extent). In further accordance with this embodiment, the automatic execution of the security action with regard to the identified code package is triggered at step 310 based at least on the difference between the value of the attribute of the identified code package and the historical value of the attribute of the different code package being greater than or equal to the threshold difference.

In another example embodiment, step 308 includes, based at least on the confirmation of the existence of the identified code package, determining whether a time period between a creation date on which the identified code package was created and a current date is less than a threshold duration of time. In accordance with this embodiment, the automatic execution of the security action with regard to the identified code package is triggered at step 310 based at least on the time period between the creation date on which the identified code package was created and the current date being less than the threshold duration of time.

In yet another example embodiment, step 308 includes, based at least on the confirmation of the existence of the identified code package, determining whether a number of downloads of the identified code package over a period of time is less than a threshold number of downloads. In accordance with this embodiment, the automatic execution of the security action with regard to the identified code package is triggered at step 310 based at least on the number of downloads of the identified code package over the period of time being less than the threshold number of downloads.

In still another example embodiment, step 308 includes, based at least on the confirmation of the existence of the identified code package, determining whether a number of ratings of the identified code package over a period of time is less than a threshold number of ratings. In accordance with this embodiment, the automatic execution of the security action with regard to the identified code package is triggered at step 310 based at least on the number of ratings of the identified code package over the period of time being less than the threshold number of ratings.

In another example embodiment, step 308 includes, based at least on the confirmation of the existence of the identified code package, determining whether a reputation of the identified code package is less than a reputation threshold. In an aspect, the reputation of the identified code package is based at least on review(s) regarding the identified code package that are provided by user(s) of the identified code package, rating(s) of the identified code package that are provided by user(s) of the identified code package, and/or a reliability of the identified code package. For example, a review regarding the identified code package may indicate (e.g., describe) performance and/or ease of use of the identified code package. In another example, a rating of the identified code package may correspond to the performance and/or the ease of use of the identified code package. In accordance with this embodiment, the automatic execution of the security action with regard to the identified code package is triggered at step 310 based at least on the reputation of the identified code package being less than the reputation threshold.

In an aspect of this embodiment, the reputation of the identified code package is based at least on a reputation of a dependency of the identified code package. For example, step 308 may include, based at least on the confirmation of the existence of the identified code package, determining whether the reputation of the dependency of the identified code package is less than a reputation threshold. In an aspect, the reputation of the dependency is based at least on review(s) regarding the dependency that are provided by user(s) of the dependency, rating(s) of the dependency that are provided by user(s) of the dependency, and/or a reliability of the dependency. For example, a review regarding the dependency may indicate (e.g., describe) performance and/or ease of use of the dependency. In another example, a rating of the dependency may correspond to the performance and/or the ease of use of the dependency. In accordance with this example, the automatic execution of the security action with regard to the identified code package may be triggered at step 310 based at least on the reputation of the dependency of the identified code package being less than the reputation threshold.

In yet another example embodiment, step 308 includes, based at least on confirmation of the existence of the identified code package, determining whether a publisher of the identified code package, which is indicated by metadata associated with the identified code package, is different from a reference publisher. In further accordance with this embodiment, the automatic execution of the security action with regard to the identified code package is triggered at step 310 based at least on the publisher of the identified code package, as indicated by the metadata, being different from the reference publisher.

It will be recognized that the computing system 400 may not include one or more of the AI-generated code recommendation security logic 408, the store 410, the control logic 412, the AI model 414, the package analysis logic 416, the security action logic 418, the existence determination logic 420, and/or the trust determination logic 422. Furthermore, the computing system 400 may include components in addition to or in lieu of the AI-generated code recommendation security logic 408, the store 410, the control logic 412, the AI model 414, the package analysis logic 416, the security action logic 418, the existence determination logic 420, and/or the trust determination logic 422.

Figure 5:
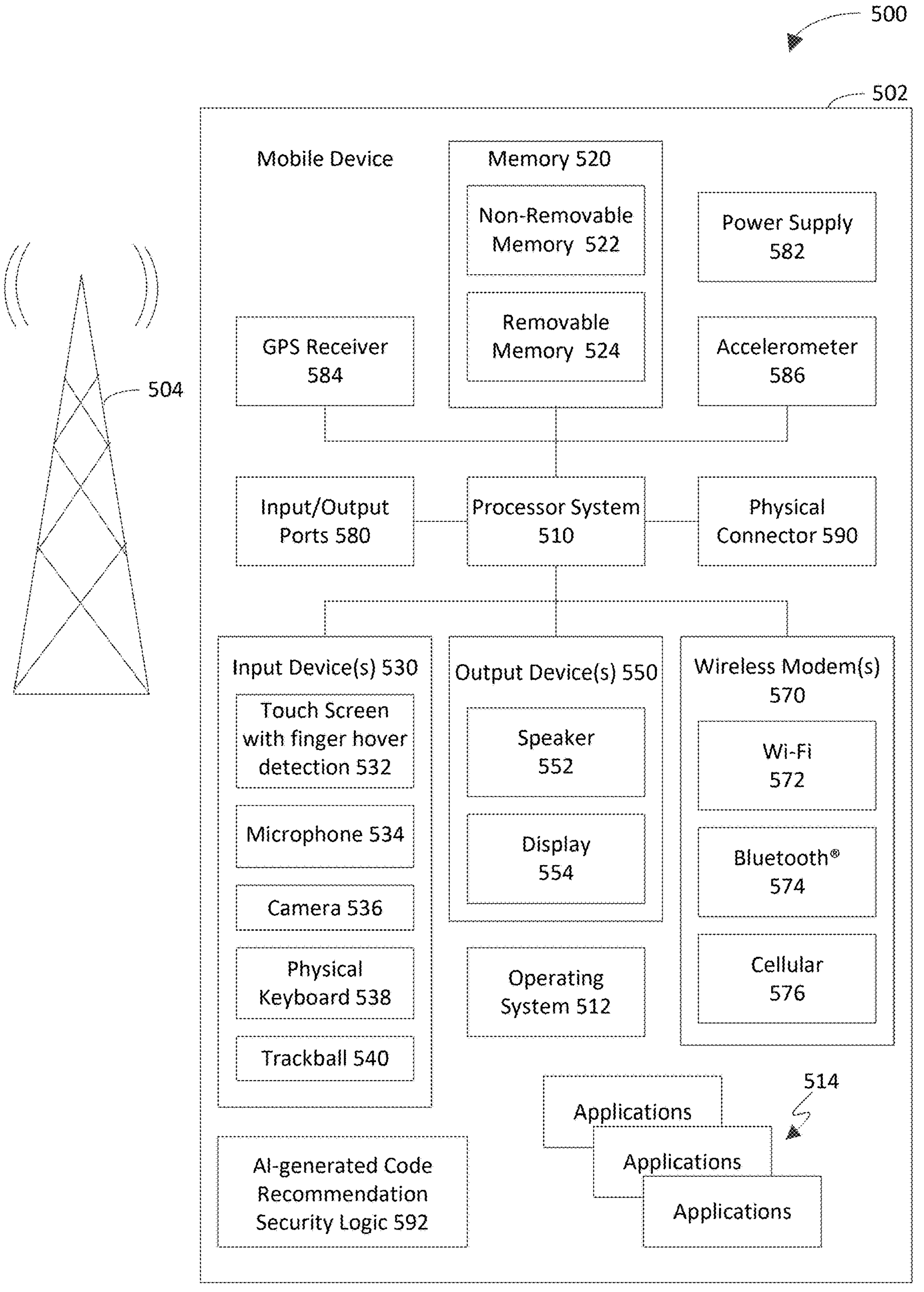
FIG. 5 is a system diagram of an example mobile device in accordance with an embodiment.

FIG. 5 is a system diagram of an example mobile device 500 including a variety of optional hardware and software components, shown generally as 502. Any components 502 in the mobile device may communicate with any other component, though not all connections are shown, for ease of illustration. The mobile device 500 may be any of a variety of computing devices (e.g., cell phone, smartphone, handheld computer, Personal Digital Assistant (PDA), etc.) and may allow wireless two-way communications with one or more mobile communications networks 504, such as a cellular or satellite network, or with a local area or wide area network.

The mobile device 500 includes a processor system 510 (e.g., signal processor, microprocessor, ASIC, or other control and processing logic circuitry) for performing such tasks as signal coding, data processing, input/output processing, power control, and/or other functions. An operating system 512 may control the allocation and usage of the components 502 and support for one or more applications 514 (a.k.a. application programs). The applications 514 may include common mobile computing applications (e.g., email applications, calendars, contact managers, web browsers, messaging applications) and any other computing applications (e.g., word processing applications, mapping applications, media player applications).

The mobile device 500 includes AI-generated code recommendation security logic 592, which is operable in a manner similar to the AI-generated code recommendation security logic 108 described above with reference to FIG. 1 and/or the AI-generated code recommendation security logic 408 described above with reference to FIG. 4.

The mobile device 500 includes memory 520. The memory 520 may include non-removable memory 522 and/or removable memory 524. The non-removable memory 522 may include random access memory (RAM), read-only memory (ROM), flash memory, a hard disk, or other well-known memory storage technologies. The removable memory 524 may include flash memory or a Subscriber Identity Module (SIM) card, which is well known in Global System for Mobile Communications (GSM) systems, or other well-known memory storage technologies, such as "smart cards." The memory 520 may store data and/or code for running the operating system 512 and the applications 514. Example data may include web pages, text, images, sound files, video data, or other data sets to be sent to and/or received from one or more network servers or other devices via one or more wired or wireless networks. Memory 520 may store a subscriber identifier, such as an International Mobile Subscriber Identity (IMSI), and an equipment identifier, such as an International Mobile Equipment Identifier (IMEI). Such identifiers may be transmitted to a network server to identify users and equipment.

The mobile device 500 may support one or more input devices 530, such as a touch screen 532, microphone 534, camera 536, physical keyboard 538 and/or trackball 540 and one or more output devices 550, such as a speaker 552 and a display 554. Touch screens, such as the touch screen 532, may detect input in different ways. For example, capacitive touch screens detect touch input when an object (e.g., a fingertip) distorts or interrupts an electrical current running across the surface. As another example, touch screens may use optical sensors to detect touch input when beams from the optical sensors are interrupted. Physical contact with the surface of the screen is not necessary for input to be detected by some touch screens. For example, the touch screen 532 may support a finger hover detection using capacitive sensing, as is well understood. Other detection techniques may be used, including camera-based detection and ultrasonic-based detection. To implement a finger hover, a user's finger is typically within a predetermined spaced distance above the touch screen, such as between 0.1 to 0.25 inches, or between 0.25 inches and 0.5 inches, or between 0.5 inches and 0.75 inches, or between 0.75 inches and 1 inch, or between 1 inch and 1.5 inches, etc.

Other possible output devices (not shown) may include piezoelectric or other haptic output devices. Some devices may serve more than one input/output function. For example, touch screen 532 and display 554 may be combined in a single input/output device. The input devices 530 may include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (e.g., electroencephalography (EEG) and related methods). Thus, in one specific example, the operating system 512 or applications 514 may include speech-recognition software as part of a voice control interface that allows a user to operate the mobile device 500 via voice commands. Furthermore, the mobile device 500 may include input devices and software that allows for user interaction via a user's spatial gestures, such as detecting and interpreting gestures to provide input to a gaming application.

Wireless modem(s) 570 may be coupled to antenna(s) (not shown) and may support two-way communications between the processor system 510 and external devices, as is well understood in the art. The modem(s) 570 are shown generically and may include a cellular modem 576 for communicating with the mobile communication network 504 and/or other radio-based modems (e.g., Bluetooth® 574 and/or Wi-Fi 572). At least one of the wireless modem(s) 570 is typically configured for communication with one or more cellular networks, such as a GSM network for data and voice communications within a single cellular network, between cellular networks, or between the mobile device and a public switched telephone network (PSTN).

The mobile device 500 may further include at least one input/output port 580, a power supply 582, a satellite navigation system receiver 584, such as a Global Positioning System (GPS) receiver, an accelerometer 586, and/or a physical connector 590, which may be a universal serial bus (USB) port, IEEE 1394 (FireWire) port, and/or RS-232 port. The illustrated components 502 are not required or all-inclusive, as any components may be deleted and other components may be added as would be recognized by one skilled in the art.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of the AI-generated code recommendation security logic 108, the AI-generated code recommendation security logic 408, the store 410, the control logic 412, the AI model 414, the package analysis logic 416, the security action logic 418, the existence determination logic 420, the trust determination logic 422, flowchart 200, and/or flowchart 300 may be implemented in hardware, software, firmware, or any combination thereof.

For example, any one or more of the AI-generated code recommendation security logic 108, the AI-generated code recommendation security logic 408, the store 410, the control logic 412, the AI model 414, the package analysis logic 416, the security action logic 418, the existence determination logic 420, the trust determination logic 422, flowchart 200, and/or flowchart 300 may be implemented, at least in part, as computer program code configured to be executed in one or more processors.

In another example, any one or more of the AI-generated code recommendation security logic 108, the AI-generated code recommendation security logic 408, the store 410, the control logic 412, the AI model 414, the package analysis logic 416, the security action logic 418, the existence determination logic 420, the trust determination logic 422, flowchart 200, and/or flowchart 300 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 6:
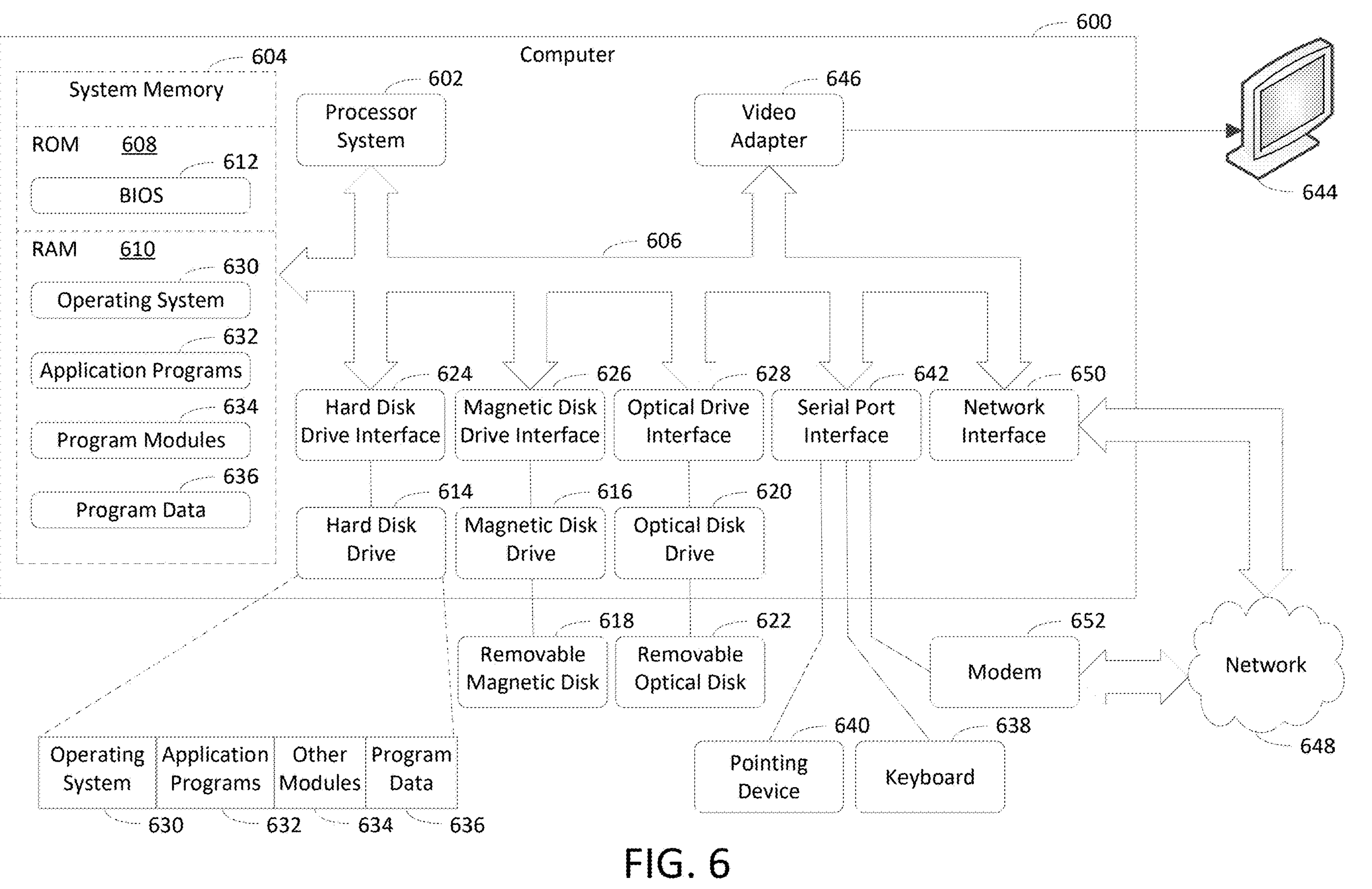
FIG. 6 depicts an example computer in which embodiments may be implemented.

II. Further Discussion of Some Example Embodiments (A1) A first example system (FIG. 1, 102A-102M, 106A-106N; FIG. 4, 400; FIG. 5, 502; FIG. 6, 600) comprises a processor system (FIG. 5, 510; FIG. 6, 602) and a memory (FIG. 5, 520, 522, 524; FIG. 6, 604, 608, 610) that stores computer-executable instructions. The computer-executable instructions are executable by the processor system to at least cause (FIG. 2, 202) an artificial intelligence (AI) model (FIG. 4, 414) to recommend an identified code package to resolve a coding problem by providing an AI prompt (FIG. 4, 424) to the AI model. The AI prompt requests that the AI model identify a code package that is written in a programming language and that comprises a designated functionality that resolves the coding problem. The computer-executable instructions are executable by the processor system further to at least receive (FIG. 2, 204) a response (FIG. 4, 428) to the AI prompt from the AI model, the response comprising a package identifier (FIG. 4, 430) that identifies the identified code package. The computer-executable instructions are executable by the processor system further to at least analyze (FIG. 2, 206) a plurality of code packages (FIG. 4, 436) for non-existence of the identified code package or absence of publication of the identified code package in a verified code repository. The computer-executable instructions are executable by the processor system further to at least, based at least on confirmation of the non-existence of the identified code package or the absence of the publication of the identified code package in the verified code repository, trigger (FIG. 2, 208) automatic execution of a security action (FIG. 4, 438) with regard to the identified code package.

(A2) In the example system of A1, wherein the computer-executable instructions are executable by the processor system to at least: trigger automatic execution of a computer-executable instruction that provides an alert regarding the identified package to a user via a user interface.

(A3) In the example system of any of A1-A2, wherein the computer-executable instructions are executable by the processor system to at least: receive the AI prompt from a user;

and trigger automatic execution of a computer-executable instruction that blocks the package identifier from being provided to the user.

(A4) In the example system of any of A1-A3, wherein the computer-executable instructions are executable by the processor system to at least: receive the AI prompt from a user; trigger automatic execution of a computer-executable instruction that generates a second response from the response to the AI prompt by replacing the package identifier in the response with a second package identifier that identifies a second code package, which is different from the identified code package; and provide the second response in lieu of the response to the user.

(A5) In the example system of any of A1-A4, wherein the computer-executable instructions are executable by the processor system to at least: provide the AI prompt together with code that is being accessed by a user as inputs to the AI model, wherein the AI prompt requests that the AI model identify a code package that is written in the programming language and that comprises the designated functionality that resolves the coding problem associated with the code that is being accessed by the user, wherein the code that is being accessed by the user comprises context regarding the AI prompt.

(A6) In the example system of any of A1-A5, wherein the computer-executable instructions are executable by the processor system to at least: analyze the plurality of code packages by cross-referencing the identified code package with the plurality of code packages, which are known to exist; and based at least on confirmation of absence of the identified code package in the plurality of code packages, trigger the automatic execution of the security action with regard to the identified code package.

(A7) In the example system of any of A1-A6, wherein the computer-executable instructions are executable by the processor system to at least: analyze the plurality of code packages for the absence of the publication of the identified code package in the verified code repository; and based at least on the confirmation of the absence of the publication of the identified code package in the verified code repository, trigger the automatic execution of the security action with regard to the identified code package.

(A8) In the example system of any of A1-A7, wherein the AI prompt specifies that the AI model is to select the code package from the plurality of code packages in a specified code repository; and wherein the computer-executable instructions are executable by the processor system to at least: analyze the plurality of code packages for absence of publication of the identified code package in the specified code repository; and based at least on confirmation of the absence of the publication of the identified code package in the specified code repository, trigger the automatic execution of the security action with regard to the identified code package.

(B1) A second example system (FIG. 1, 102A-102M, 106A-106N; FIG. 4, 400; FIG. 5, 502; FIG. 6, 600) comprises a processor system (FIG. 5, 510; FIG. 6, 602) and a memory (FIG. 5, 520, 522, 524; FIG. 6, 604, 608, 610) that stores computer-executable instructions. The computer-executable instructions are executable by the processor system to at least cause (FIG. 3, 302) an artificial intelligence (AI) model (FIG. 4, 414) to recommend an identified code package to resolve a coding problem by providing an AI prompt (FIG. 4, 424) to the AI model. The AI prompt specifies the coding problem, a programming language, and a designated functionality that resolves the coding problem. The AI prompt requests that the AI model identify a code package that is written in the programming language and that comprises the designated functionality that resolves the coding problem. The computer-executable instructions are executable by the processor system further to at least receive (FIG. 3, 304) a response (FIG. 4, 428) to the AI prompt from the AI model, the response comprising a package identifier (FIG. 4, 430) that identifies the identified code package. The computer-executable instructions are executable by the processor system further to at least analyze (FIG. 3, 306) a plurality of code packages (FIG. 4, 436) for existence of the identified code package. The computer-executable instructions are executable by the processor system further to at least, based at least on confirmation of the existence of the identified code package, determine (FIG. 3, 308) whether a value of an attribute of the identified code package satisfies a criterion associated with non-trustworthiness. The computer-executable instructions are executable by the processor system further to at least, based at least on the value of the attribute of the identified code package satisfying the criterion associated with non-trustworthiness, trigger (FIG. 3, 310) automatic execution of a security action (FIG. 4, 438) with regard to the identified code package.

(B2) In the example system of B1, wherein the computer-executable instructions are executable by the processor system to at least: analyze the plurality of code packages for publication of the identified code package in a verified code repository; and based at least on confirmation of the publication of the identified code package in the verified code repository, determine whether the value of the attribute of the identified code package satisfies the criterion associated with non-trustworthiness.

(B3) In the example system of any of B1-B2, wherein the computer-executable instructions are executable by the processor system to at least: based at least on the confirmation of the existence of the identified code package, determine whether the value of the attribute of the identified code package satisfies the criterion associated with non-trustworthiness by analyzing the identified code package relative to a historical value of the attribute of a different code package, which has been recommended by the AI model, using natural language processing, wherein the criterion requires the value of the attribute of the identified code package to differ from the historical value of the attribute of the different code package by at least a designated extent; and based at least on the value of the attribute of the identified code package differing from the historical value of the attribute of the different code package by at least the designated extent, trigger the automatic execution of the security action with regard to the identified code package.

(B4) In the example system of any of B1-B3, wherein the computer-executable instructions are executable by the processor system to at least: based at least on the confirmation of the existence of the identified code package, determine whether a time period between a creation date on which the identified code package was created and a current date is less than a threshold duration of time; and based at least on the time period between the creation date on which the identified code package was created and the current date being less than the threshold duration of time, trigger the automatic execution of the security action with regard to the identified code package.

(B5) In the example system of any of B1-B4, wherein the computer-executable instructions are executable by the processor system to at least: based at least on the confirmation of the existence of the identified code package, determine whether a number of downloads of the identified code package over a period of time is less than a threshold number of downloads; and based at least on the number of downloads of the identified code package over the period of time being less than the threshold number of downloads, trigger the automatic execution of the security action with regard to the identified code package.

(B6) In the example system of any of B1-B5, wherein the computer-executable instructions are executable by the processor system to at least: based at least on the confirmation of the existence of the identified code package, determine whether a number of ratings of the identified code package over a period of time is less than a threshold number of ratings; and based at least on the number of ratings of the identified code package over the period of time being less than the threshold number of ratings, trigger the automatic execution of the security action with regard to the identified code package.

(B7) In the example system of any of B1-B6, wherein the computer-executable instructions are executable by the processor system to at least: based at least on the confirmation of the existence of the identified code package, determine whether a reputation of the identified code package is less than a reputation threshold; and based at least on the reputation of the identified code package being less than the reputation threshold, trigger the automatic execution of the security action with regard to the identified code package.

(B8) In the example system of any of B1-B7, wherein the reputation of the identified code package is based at least on a reputation of a dependency of the identified code package.

(B9) In the example system of any of B1-B8, wherein the AI prompt specifies that the AI model is to derive the code package from code packages in a specified code repository; and wherein the package identifier identifies the identified code package, which is derived from the code packages in the specified code repository.

(B10) In the example system of any of B1-B9, wherein the AI prompt specifies that the AI model is to use a designated computer program, which is separate from the AI model, to identify the identified code package, the designated computer program configured to search in a specified code repository for the identified code package; and wherein the computer-executable instructions are executable by the processor system to at least: analyze the plurality of code packages in the specified code repository for the existence of the identified code package; and based at least on confirmation of the existence of the identified code package in the specified code repository, determine whether the value of the attribute of the identified code package satisfies the criterion associated with non-trustworthiness.

(B11) In the example system of any of B1-B10, wherein the AI prompt specifies that the AI model is to use a designated computer program, which is separate from the AI model, to determine whether the value of the attribute of the identified code package violates a security policy; and wherein the computer-executable instructions are executable by the processor system to at least: based at least on confirmation of the existence of the identified code package in the specified code repository, cause the AI model to determine, by using the designated computer program, whether the value of the attribute of the identified code package violates the security policy; and based at least on the value of the attribute of the identified code package violating the security policy, trigger the automatic execution of the security action with regard to the identified code package.

(B12) In the example system of any of B1-B11, wherein the AI prompt specifies that the AI model is to use a designated computer program, which is separate from the AI model, to determine whether the identified code package violates an authentication policy that requires the identified code package to be authenticated; and wherein the computer-executable instructions are executable by the processor system to at least: based at least on confirmation of the existence of the identified code package in the specified code repository, cause the AI model to determine, by using the designated computer program, whether the identified code package violates the authentication policy; and based at least on the identified code package violating the authentication policy, trigger the automatic execution of the security action with regard to the identified code package.

(B13) In the example system of any of B1-B12, wherein the AI prompt further specifies that the AI model is to provide a reference that indicates a location of the identified code package; and wherein the computer-executable instructions are executable by the processor system to at least: based at least on confirmation of the existence of the identified code package in the specified code repository, determine whether the AI model provides the reference that indicates a valid location of the identified code package; and based at least on confirmation that the AI model fails to provide the reference that indicates the valid location of the identified code package, trigger the automatic execution of the security action with regard to the identified code package.

(C1) A first example method is implemented by a computing system (FIG. 1, 102A-102M, 106A-106N; FIG. 4, 400; FIG. 5, 502; FIG. 6, 600). The method comprises causing (FIG. 2, 202) an artificial intelligence (AI) model (FIG. 4, 414) to recommend an identified code package to resolve a coding problem by providing an AI prompt (FIG. 4, 424) to the AI model. The AI prompt specifies the coding problem, a programming language, and a designated functionality that resolves the coding problem. The AI prompt requests that the AI model identify a code package that is written in the programming language and that comprises the designated functionality that resolves the coding problem. The method further comprises receiving (FIG. 2, 204) a response (FIG. 4, 428) to the AI prompt from the AI model, the response comprising a package identifier (FIG. 4, 430) that identifies the identified code package. The method further comprises analyzing (FIG. 2, 206) a plurality of code packages (FIG. 4, 436) for non-existence of the identified code package or absence of publication of the identified code package in a verified code repository. The method further comprises, based at least on confirmation of the non-existence of the identified code package or the absence of the publication of the identified code package in the verified code repository, triggering (FIG. 2, 208) automatic execution of a security action (FIG. 4, 438) with regard to the identified code package.

(C2) In the example method of C1, wherein triggering the automatic execution of the security action comprises: triggering automatic execution of a computer-executable instruction that provides an alert regarding the identified package to a user via a user interface.

(C3) In the example method of any of C1-C2, further comprising: receiving the AI prompt from a user; wherein triggering the automatic execution of the security action comprises: triggering automatic execution of a computer-executable instruction that blocks the package identifier from being provided to the user.

(C4) In the example method of any of C1-C3, further comprising: receiving the AI prompt from a user; wherein triggering the automatic execution of the security action comprises: triggering automatic execution of a computer-executable instruction that generates a second response from the response to the AI prompt by replacing the package identifier in the response with a second package identifier that identifies a second code package, which is different from the identified code package; and providing the second response in lieu of the response to the user.

(C5) In the example method of any of C1-C4, wherein causing the AI model to recommend the identified code package comprises: providing the AI prompt together with code that is being accessed by a user as inputs to the AI model, wherein the AI prompt requests that the AI model identify a code package that is written in the programming language and that comprises the designated functionality that resolves the coding problem associated with the code that is being accessed by the user, wherein the code that is being accessed by the user comprises context regarding the AI prompt.

(C6) In the example method of any of C1-C5, wherein analyzing the plurality of code packages comprises: cross-referencing the identified code package with the plurality of code packages, which are known to exist; and wherein triggering the automatic execution of the security action comprises: based at least on confirmation of absence of the identified code package in the plurality of code packages, triggering the automatic execution of the security action with regard to the identified code package.

(C7) In the example method of any of C1-C6, wherein analyzing the plurality of code packages comprises: analyzing the plurality of code packages for the absence of the publication of the identified code package in the verified code repository; and wherein triggering the automatic execution of the security action comprises: based at least on the confirmation of the absence of the publication of the identified code package in the verified code repository, triggering the automatic execution of the security action with regard to the identified code package.

(C8) In the example method of any of C1-C7, wherein the AI prompt specifies that the AI model is to select the code package from the plurality of code packages in a specified code repository; wherein analyzing the plurality of code packages comprises: analyzing the plurality of code packages for absence of publication of the identified code package in the specified code repository; and wherein triggering the automatic execution of the security action comprises: based at least on confirmation of the absence of the publication of the identified code package in the specified code repository, triggering the automatic execution of the security action with regard to the identified code package.

(D1) A second example method is implemented by a computing system (FIG. 1, 102A-102M, 106A-106N; FIG. 4, 400; FIG. 5, 502; FIG. 6, 600). The method comprises causing (FIG. 3, 302) an artificial intelligence (AI) model (FIG. 4, 414) to recommend an identified code package to resolve a coding problem by providing an AI prompt (FIG. 4, 424) to the AI model. The AI prompt requests that the AI model identify a code package that is written in a programming language and that comprises a designated functionality that resolves the coding problem. The method further comprises receiving (FIG. 3, 304) a response (FIG. 4, 428) to the AI prompt from the AI model, the response comprising a package identifier (FIG. 4, 430) that identifies the identified code package. The method further comprises analyzing (FIG. 3, 306) a plurality of code packages (FIG. 4, 436) for existence of the identified code package. The method further comprises, based at least on confirmation of the existence of the identified code package, determining (FIG. 3, 308) whether a value of an attribute of the identified code package satisfies a criterion associated with non-trustworthiness. The method further comprises, based at least on the value of the attribute of the identified code package satisfying the criterion associated with non-trustworthiness, triggering (FIG. 3, 310) automatic execution of a security action (FIG. 4, 438) with regard to the identified code package.

(D2) In the example method of D1, wherein analyzing the plurality of code packages comprises: analyzing the plurality of code packages for publication of the identified code package in a verified code repository; and wherein determining whether the value of the attribute of the identified code package satisfies the criterion comprises: based at least on confirmation of the publication of the identified code package in the verified code repository, determining whether the value of the attribute of the identified code package satisfies the criterion associated with non-trustworthiness.

(D3) In the example method of any of D1-D2, wherein determining whether the value of the attribute of the identified code package satisfies the criterion comprises: based at least on the confirmation of the existence of the identified code package, determining whether the value of the attribute of the identified code package satisfies the criterion associated with non-trustworthiness by analyzing the identified code package relative to a historical value of the attribute of a different code package, which has been recommended by the AI model, using natural language processing, wherein the criterion requires the value of the attribute of the identified code package to differ from the historical value of the attribute of the different code package by at least a designated extent; and wherein triggering the automatic execution of the security action comprises: based at least on the value of the attribute of the identified code package differing from the historical value of the attribute of the different code package by at least the designated extent, triggering the automatic execution of the security action with regard to the identified code package.

(D4) In the example method of any of D1-D3, wherein determining whether the value of the attribute of the identified code package satisfies the criterion comprises: based at least on the confirmation of the existence of the identified code package, determining whether a time period between a creation date on which the identified code package was created and a current date is less than a threshold duration of time; and wherein triggering the automatic execution of the security action comprises: based at least on the time period between the creation date on which the identified code package was created and the current date being less than the threshold duration of time, triggering the automatic execution of the security action with regard to the identified code package.

(D5) In the example method of any of D1-D4, wherein determining whether the value of the attribute of the identified code package satisfies the criterion comprises: based at least on the confirmation of the existence of the identified code package, determining whether a number of downloads of the identified code package over a period of time is less than a threshold number of downloads; and wherein triggering the automatic execution of the security action comprises: based at least on the number of downloads of the identified code package over the period of time being less than the threshold number of downloads, triggering the automatic execution of the security action with regard to the identified code package.

(D6) In the example method of any of D1-D5, wherein determining whether the value of the attribute of the identified code package satisfies the criterion comprises: based at least on the confirmation of the existence of the identified code package, determining whether a number of ratings of the identified code package over a period of time is less than a threshold number of ratings; and wherein triggering the automatic execution of the security action comprises: based at least on the number of ratings of the identified code package over the period of time being less than the threshold number of ratings, triggering the automatic execution of the security action with regard to the identified code package.

(D7) In the example method of any of D1-D6, wherein determining whether the value of the attribute of the identified code package satisfies the criterion comprises: based at least on the confirmation of the existence of the identified code package, determining whether a reputation of the identified code package is less than a reputation threshold; and wherein triggering the automatic execution of the security action comprises: based at least on the reputation of the identified code package being less than the reputation threshold, triggering the automatic execution of the security action with regard to the identified code package.

(D8) In the example method of any of D1-D7, wherein the reputation of the identified code package is based at least on a reputation of a dependency of the identified code package.

(D9) In the example method of any of D1-D8, wherein the AI prompt specifies that the AI model is to derive the code package from code packages in a specified code repository; and wherein the package identifier identifies the identified code package, which is derived from the code packages in the specified code repository.

(D10) In the example method of any of D1-D9, wherein the AI prompt specifies that the AI model is to use a designated computer program, which is separate from the AI model, to identify the identified code package, the designated computer program configured to search in a specified code repository for the identified code package; wherein analyzing the plurality of code packages for the existence of the identified code package comprises: analyzing the plurality of code packages in the specified code repository for the existence of the identified code package; and wherein determining whether the value of the attribute of the identified code package satisfies the criterion comprises: based at least on confirmation of the existence of the identified code package in the specified code repository, determining whether the value of the attribute of the identified code package satisfies the criterion associated with non-trustworthiness.

(D11) In the example method of any of D1-D10, wherein the AI prompt specifies that the AI model is to use a designated computer program, which is separate from the AI model, to determine whether the value of the attribute of the identified code package violates a security policy; wherein determining whether the value of the attribute of the identified code package satisfies the criterion associated with non-trustworthiness comprises: based at least on confirmation of the existence of the identified code package in the specified code repository, causing the AI model to determine, by using the designated computer program, whether the value of the attribute of the identified code package violates the security policy; and wherein triggering the automatic execution of the security action with regard to the identified code package comprises: based at least on the value of the attribute of the identified code package violating the security policy, triggering the automatic execution of the security action with regard to the identified code package.

(D12) In the example method of any of D1-D11, wherein the AI prompt specifies that the AI model is to use a designated computer program, which is separate from the AI model, to determine whether the identified code package violates an authentication policy that requires the identified code package to be authenticated; wherein determining whether the value of the attribute of the identified code package satisfies the criterion associated with non-trustworthiness comprises: based at least on confirmation of the existence of the identified code package in the specified code repository, causing the AI model to determine, by using the designated computer program, whether the identified code package violates the authentication policy; and wherein triggering the automatic execution of the security action with regard to the identified code package comprises: based at least on the identified code package violating the authentication policy, triggering the automatic execution of the security action with regard to the identified code package.

(D13) In the example method of any of D1-D12, wherein the AI prompt further specifies that the AI model is to provide a reference that indicates a location of the identified code package; wherein determining whether the value of the attribute of the identified code package satisfies the criterion associated with non-trustworthiness comprises: based at least on confirmation of the existence of the identified code package in the specified code repository, determining whether the AI model provides the reference that indicates a valid location of the identified code package; and wherein triggering the automatic execution of the security action with regard to the identified code package comprises: based at least on confirmation that the AI model fails to provide the reference that indicates the valid location of the identified code package, triggering the automatic execution of the security action with regard to the identified code package.

(E1) A first example computer program product (FIG. 5, 524; FIG. 6, 618, 622) comprises a computer-readable storage medium having instructions recorded thereon for enabling a processor-based system (FIG. 1, 102A-102M, 106A-106N; FIG. 4, 400; FIG. 5, 502; FIG. 6, 600) to perform operations. The operations comprise causing (FIG. 2, 202) an artificial intelligence (AI) model (FIG. 4, 414) to recommend an identified code package to resolve a coding problem by providing an AI prompt (FIG. 4, 424) to the AI model. The AI prompt specifies the coding problem, a programming language, and a designated functionality that resolves the coding problem. The AI prompt requests that the AI model identify a code package that is written in the programming language and that comprises the designated functionality that resolves the coding problem. The operations further comprise receiving (FIG. 2, 204) a response (FIG. 4, 428) to the AI prompt from the AI model, the response comprising a package identifier (FIG. 4, 430) that identifies the identified code package. The operations further comprise analyzing (FIG. 2, 206) a plurality of code packages (FIG. 4, 436) for non-existence of the identified code package or absence of publication of the identified code package in a verified code repository. The operations further comprise, based at least on confirmation of the non-existence of the identified code package or the absence of the publication of the identified code package in the verified code repository, triggering (FIG. 2, 208) automatic execution of a security action (FIG. 4, 438) with regard to the identified code package.

(F1) A second example computer program product (FIG. 5, 524; FIG. 6, 618, 622) comprises a computer-readable storage medium having instructions recorded thereon for enabling a processor-based system (FIG. 1, 102A-102M, 106A-106N; FIG. 4, 400; FIG. 5, 502; FIG. 6, 600) to perform operations. The operations comprise causing (FIG. 3, 302) an artificial intelligence (AI) model (FIG. 4, 414) to recommend an identified code package to resolve a coding problem by providing an AI prompt (FIG. 4, 424) to the AI model. The AI prompt specifies the coding problem, a programming language, and a designated functionality that resolves the coding problem. The AI prompt requests that the AI model identify a code package that is written in the programming language and that comprises the designated functionality that resolves the coding problem. The operations further comprise receiving (FIG. 3, 304) a response (FIG. 4, 428) to the AI prompt from the AI model. The response comprises a package identifier (FIG. 4, 430) that identifies the identified code package. The operations further comprise analyzing (FIG. 3, 306) a plurality of code packages (FIG. 4, 436) for existence of the identified code package. The operations further comprise, based at least on confirmation of the existence of the identified code package, determining (FIG. 3, 308) whether a value of an attribute of the identified code package satisfies a criterion associated with non-trustworthiness. The operations further comprise, based at least on the value of the attribute of the identified code package satisfying the criterion associated with non-trustworthiness, triggering (FIG. 3, 310) automatic execution of a security action (FIG. 4, 438) with regard to the identified code package.

(G1) A third example computer program product (FIG. 5, 524; FIG. 6, 618, 622) comprises a computer-readable storage medium having instructions recorded thereon for enabling a processor-based system (FIG. 1, 102A-102M, 106A-106N; FIG. 4, 400; FIG. 5, 502; FIG. 6, 600) to perform operations. The operations comprise providing an artificial intelligence (AI) prompt (FIG. 4, 424), which requests identification of a code package that is written in a programming language and that comprises a designated functionality that resolves a coding problem, to an AI model (FIG. 4, 414), which causes (FIG. 3, 302) the AI model to recommend an identified code package to resolve the coding problem. The AI prompt specifies the coding problem, the programming language, and the designated functionality that resolves the coding problem. The operations further comprise receiving (FIG. 3, 304) a response (FIG. 4, 428) to the AI prompt from the AI model. The response comprises a package identifier (FIG. 4, 430) that identifies the identified code package. The operations further comprise confirming (FIG. 3, 306) that the identified code package exists. The operations further comprise, based at least on confirmation that the identified code package exists, determining (FIG. 3, 308) whether a value of an attribute of the identified code package satisfies a criterion associated with non-trustworthiness. The operations further comprise, based at least on the value of the attribute of the identified code package satisfying the criterion associated with non-trustworthiness, triggering (FIG. 3, 310) automatic execution of a security action (FIG. 4, 438) with regard to the identified code package.

III. Example Computer System

FIG. 6 depicts an example computer 600 in which embodiments may be implemented. Any one or more of the user devices 102A-102M and/or any one or more of the servers 106A-106N shown in FIG. 1 and/or the computing system 400 shown in FIG. 4 may be implemented using computer 600, including one or more features of computer 600 and/or alternative features. Computer 600 may be a general-purpose computing device in the form of a conventional personal computer, a mobile computer, or a workstation, for example, or computer 600 may be a special purpose computing device. The description of computer 600 provided herein is provided for purposes of illustration, and is not intended to be limiting. Embodiments may be implemented in further types of computer systems, as would be known to persons skilled in the relevant art(s).

As shown in FIG. 6, computer 600 includes a processor system 602, a system memory 604, and a bus 606 that couples various system components including system memory 604 to processor system 602. Bus 606 represents one or more of any of several types of bus structures, including a memory bus or memory controller, a peripheral bus, an accelerated graphics port, and a processor or local bus using any of a variety of bus architectures. System memory 604 includes read only memory (ROM) 608 and random access memory (RAM) 610. A basic input/output system 612 (BIOS) is stored in ROM 608.

Computer 600 also has one or more of the following drives: a hard disk drive 614 for reading from and writing to a hard disk, a magnetic disk drive 616 for reading from or writing to a removable magnetic disk 618, and an optical disk drive 620 for reading from or writing to a removable optical disk 622 such as a CD ROM, DVD ROM, or other optical media. Hard disk drive 614, magnetic disk drive 616, and optical disk drive 620 are connected to bus 606 by a hard disk drive interface 624, a magnetic disk drive interface 626, and an optical drive interface 628, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 630, one or more application programs 632, other program modules 634, and program data 636. Application programs 632 or program modules 634 may include, for example, computer program logic for implementing any one or more of (e.g., at least a portion of) the AI-generated code recommendation security logic 108, the AI-generated code recommendation security logic 408, the store 410, the control logic 412, the AI model 414, the package analysis logic 416, the security action logic 418, the existence determination logic 420, the trust determination logic 422, flowchart 200 (including any step of flowchart 200), and/or flowchart 300 (including any step of flowchart 300), as described herein.

A user may enter commands and information into the computer 600 through input devices such as keyboard 638 and pointing device 640. Other input devices (not shown) may include a microphone, joystick, game pad, satellite dish, scanner, touch screen, camera, accelerometer, gyroscope, or the like. These and other input devices are often connected to the processor system 602 through a serial port interface 642 that is coupled to bus 606, but may be connected by other interfaces, such as a parallel port, game port, or a universal serial bus (USB).

A display device 644 (e.g., a monitor) is also connected to bus 606 via an interface, such as a video adapter 646. In addition to display device 644, computer 600 may include other peripheral output devices (not shown) such as speakers and printers.

Computer 600 is connected to a network 648 (e.g., the Internet) through a network interface or adapter 650, a modem 652, or other means for establishing communications over the network. Modem 652, which may be internal or external, is connected to bus 606 via serial port interface 642.

As used herein, the terms "computer program medium" and "computer-readable storage medium" are used to generally refer to media (e.g., non-transitory media) such as the hard disk associated with hard disk drive 614, removable magnetic disk 618, removable optical disk 622, as well as other media such as flash memory cards, digital video disks, random access memories (RAMs), read only memories (ROM), and the like. A computer-readable storage medium is not a signal, such as a carrier signal or a propagating signal. For instance, a computer-readable storage medium may not include a signal. Accordingly, a computer-readable storage medium does not constitute a signal per se. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 632 and other program modules 634) may be stored on the hard disk, magnetic disk, optical disk, ROM, or RAM. Such computer programs may also be received via network interface 650 or serial port interface 642. Such computer programs, when executed or loaded by an application, enable computer 600 to implement features of embodiments discussed herein. Accordingly, such computer programs represent controllers of the computer 600.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

IV. Conclusion

The foregoing detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system comprising:

a processor system; and a memory that stores computer-executable instructions that are executable by the processor system to at least:

cause an artificial intelligence (AI) model to recommend an identified code package to resolve a coding problem by providing an AI prompt to the AI model, wherein the AI prompt requests that the AI model identify a code package that is written in a programming language and that comprises a designated functionality that resolves the coding problem;

receive a response to the AI prompt from the AI model, the response comprising a package identifier that identifies the identified code package;

in response to receipt of the response, which comprises the package identifier that identifies the identified code package, from the AI model, analyze a plurality of code packages for non-existence of the identified code package or absence of publication of the identified code package in a verified code repository; and in response to receipt of the response, which comprises the package identifier that identifies the identified code package, from the AI model, based at least on confirmation of the non-existence of the identified code package or the absence of the publication of the identified code package in the verified code repository, quarantine the identified code package in a sandbox or block access to the identified code package.

2. The system of claim 1, wherein the computer-executable instructions are executable by the processor system to at least:

trigger automatic execution of a computer-executable instruction that provides an alert regarding the identified package to a user via a user interface.

3. The system of claim 1, wherein the computer-executable instructions are executable by the processor system to at least:

receive the AI prompt from a user; and trigger automatic execution of a computer-executable instruction that blocks the package identifier from being provided to the user.

4. The system of claim 1, wherein the computer-executable instructions are executable by the processor system to at least:

receive the AI prompt from a user;

trigger automatic execution of a computer-executable instruction that generates a second response from the response to the AI prompt by replacing the package identifier in the response with a second package identifier that identifies a second code package, which is different from the identified code package; and provide the second response in lieu of the response to the user.

5. The system of claim 1, wherein the computer-executable instructions are executable by the processor system to at least:

provide the AI prompt together with code that is being accessed by a user as inputs to the AI model, wherein the AI prompt requests that the AI model identify a code package that is written in the programming language and that comprises the designated functionality that resolves the coding problem associated with the code that is being accessed by the user, wherein the code that is being accessed by the user comprises context regarding the AI prompt.

6. The system of claim 1, wherein the computer-executable instructions are executable by the processor system to at least:

analyze the plurality of code packages by cross-referencing the identified code package with the plurality of code packages, which are known to exist; and based at least on confirmation of absence of the identified code package in the plurality of code packages, quarantining the identified code package in the sandbox or blocking the access to the identified code package.

7. The system of claim 1, wherein the computer-executable instructions are executable by the processor system to at least:

analyze the plurality of code packages for the absence of the publication of the identified code package in the verified code repository; and based at least on the confirmation of the absence of the publication of the identified code package in the verified code repository, quarantining the identified code package in the sandbox or blocking the access to the identified code package.

8. The system of claim 1, wherein the AI prompt specifies that the AI model is to select the code package from the plurality of code packages in a specified code repository; and wherein the computer-executable instructions are executable by the processor system to at least:

analyze the plurality of code packages for absence of publication of the identified code package in the specified code repository; and based at least on confirmation of the absence of the publication of the identified code package in the specified code repository, quarantining the identified code package in the sandbox or blocking the access to the identified code package.

9. A method implemented by a computing system, the method comprising:

causing an artificial intelligence (AI) model to recommend an identified code package to resolve a coding problem by providing an AI prompt to the AI model, wherein the AI prompt requests that the AI model identify a code package that is written in a programming language and that comprises a designated functionality that resolves the coding problem;

receiving a response to the AI prompt from the AI model, the response comprising a package identifier that identifies the identified code package;

in response to receipt of the response, which comprises the package identifier that identifies the identified code package, from the AI model, analyzing a plurality of code packages for existence of the identified code package;

based at least on confirmation of the existence of the identified code package, determining whether a value of an attribute of the identified code package satisfies a criterion associated with non-trustworthiness; and based at least on the value of the attribute of the identified code package satisfying the criterion associated with non-trustworthiness, quarantining the identified code package in a sandbox or blocking access to the identified code package.

10. The method of claim 9, wherein analyzing the plurality of code packages comprises:

analyzing the plurality of code packages for publication of the identified code package in a verified code repository; and wherein determining whether the value of the attribute of the identified code package satisfies the criterion comprises:

based at least on confirmation of the publication of the identified code package in the verified code repository, determining whether the value of the attribute of the identified code package satisfies the criterion associated with non-trustworthiness.

11. The method of claim 9, wherein determining whether the value of the attribute of the identified code package satisfies the criterion comprises:

based at least on the confirmation of the existence of the identified code package, determining whether the value of the attribute of the identified code package satisfies the criterion associated with non-trustworthiness by analyzing the identified code package relative to a historical value of the attribute of a different code package, which has been recommended by the AI model, using natural language processing, wherein the criterion requires the value of the attribute of the identified code package to differ from the historical value of the attribute of the different code package by at least a designated extent; and wherein quarantining the identified code package in the sandbox or blocking the access to the identified code package comprises:

based at least on the value of the attribute of the identified code package differing from the historical value of the attribute of the different code package by at least the designated extent, quarantining the identified code package in the sandbox or blocking the access to the identified code package.

12. The method of claim 9, wherein determining whether the value of the attribute of the identified code package satisfies the criterion comprises:

based at least on the confirmation of the existence of the identified code package, determining whether a time period between a creation date on which the identified code package was created and a current date is less than a threshold duration of time; and wherein quarantining the identified code package in the sandbox or blocking the access to the identified code package comprises:

based at least on the time period between the creation date on which the identified code package was created and the current date being less than the threshold duration of time, quarantining the identified code package in the sandbox or blocking the access to the identified code package.

13. The method of claim 9, wherein determining whether the value of the attribute of the identified code package satisfies the criterion comprises:

based at least on the confirmation of the existence of the identified code package, determining whether a number of downloads of the identified code package over a period of time is less than a threshold number of downloads; and wherein quarantining the identified code package in the sandbox or blocking the access to the identified code package comprises:

based at least on the number of downloads of the identified code package over the period of time being less than the threshold number of downloads, quarantining the identified code package in the sandbox or blocking the access to the identified code package.

14. The method of claim 9, wherein determining whether the value of the attribute of the identified code package satisfies the criterion comprises:

based at least on the confirmation of the existence of the identified code package, determining whether a number of ratings of the identified code package over a period of time is less than a threshold number of ratings; and wherein quarantining the identified code package in the sandbox or blocking the access to the identified code package comprises:

based at least on the number of ratings of the identified code package over the period of time being less than the threshold number of ratings, quarantining the identified code package in the sandbox or blocking the access to the identified code package.

15. The method of claim 9, wherein determining whether the value of the attribute of the identified code package satisfies the criterion comprises:

based at least on the confirmation of the existence of the identified code package, determining whether a reputation of the identified code package is less than a reputation threshold; and wherein quarantining the identified code package in the sandbox or blocking the access to the identified code package comprises:

based at least on the reputation of the identified code package being less than the reputation threshold, quarantining the identified code package in the sandbox or blocking the access to the identified code package.

16. The method of claim 15, wherein the reputation of the identified code package is based at least on a reputation of a dependency of the identified code package.

17. The method of claim 9, wherein the AI prompt specifies that the AI model is to derive the code package from code packages in a specified code repository; and wherein the package identifier identifies the identified code package, which is derived from the code packages in the specified code repository.

18. The method of claim 9, wherein the AI prompt specifies that the AI model is to use a designated computer program, which is separate from the AI model, to identify the identified code package, the designated computer program configured to search in a specified code repository for the identified code package;

wherein analyzing the plurality of code packages for the existence of the identified code package comprises:

analyzing the plurality of code packages in the specified code repository for the existence of the identified code package; and wherein determining whether the value of the attribute of the identified code package satisfies the criterion comprises:

based at least on confirmation of the existence of the identified code package in the specified code repository, determining whether the value of the attribute of the identified code package satisfies the criterion associated with non-trustworthiness.

19. The method of claim 9, wherein the AI prompt specifies that the AI model is to use a designated computer program, which is separate from the AI model, to determine whether the value of the attribute of the identified code package violates a security policy;

wherein determining whether the value of the attribute of the identified code package satisfies the criterion associated with non-trustworthiness comprises:

based at least on confirmation of the existence of the identified code package in the specified code repository, causing the AI model to determine, by using the designated computer program, whether the value of the attribute of the identified code package violates the security policy; and wherein quarantining the identified code package in the sandbox or blocking the access to the identified code package comprises:

based at least on the value of the attribute of the identified code package violating the security policy, quarantining the identified code package in the sandbox or blocking the access to the identified code package.

20. The method of claim 9, wherein the AI prompt specifies that the AI model is to use a designated computer program, which is separate from the AI model, to determine whether the identified code package violates an authentication policy that requires the identified code package to be authenticated;

wherein determining whether the value of the attribute of the identified code package satisfies the criterion associated with non-trustworthiness comprises:

based at least on confirmation of the existence of the identified code package in the specified code repository, causing the AI model to determine, by using the designated computer program, whether the identified code package violates the authentication policy; and wherein quarantining the identified code package in the sandbox or blocking the access to the identified code package comprises:

based at least on the identified code package violating the authentication policy, quarantining the identified code package in the sandbox or blocking the access to the identified code package.

21. The method of claim 9, wherein the AI prompt further specifies that the AI model is to provide a reference that indicates a location of the identified code package;

wherein determining whether the value of the attribute of the identified code package satisfies the criterion associated with non-trustworthiness comprises:

based at least on confirmation of the existence of the identified code package in the specified code repository, determining whether the AI model provides the reference that indicates a valid location of the identified code package; and wherein quarantining the identified code package in the sandbox or blocking the access to the identified code package comprises:

based at least on confirmation that the AI model fails to provide the reference that indicates the valid location of the identified code package, quarantining the identified code package in the sandbox or blocking the access to the identified code package.

22. A computer program product comprising a computer-readable storage medium having instructions recorded thereon for enabling a processor-based system to perform operations, the operations comprising:

providing an artificial intelligence (AI) prompt, which requests identification of a code package that is written in a programming language and that comprises a designated functionality that resolves a coding problem, to an AI model, which causes the AI model to recommend an identified code package to resolve the coding problem, wherein the AI prompt specifies the coding problem, the programming language, and the designated functionality that resolves the coding problem;

receiving a response to the AI prompt from the AI model, the response comprising a package identifier that identifies the identified code package;

in response to receipt of the response, which comprises the package identifier that identifies the identified code package, from the AI model, confirming that the identified code package exists;

based at least on confirmation that the identified code package exists, determining whether a value of an attribute of the identified code package satisfies a criterion associated with non-trustworthiness; and based at least on the value of the attribute of the identified code package satisfying the criterion associated with non-trustworthiness, quarantining the identified code package in a sandbox or blocking access to the identified code package.

* * * * *